US010027520B2

(12) United States Patent
Zhu et al.

(10) Patent No.: US 10,027,520 B2
(45) Date of Patent: Jul. 17, 2018

(54) METHOD AND APPARATUS FOR GENERATING, TRANSMITTING AND RECEIVING SIGNALS BASED ON FILTER BANK IN WIRELESS COMMUNICATION SYSTEM

(71) Applicant: Samsung Electronics Co., Ltd, Gyeonggi-do (KR)

(72) Inventors: Dalin Zhu, Beijing (CN); Bin Yu, Beijing (CN); Pengfei Sun, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/322,099

(22) PCT Filed: Jan. 22, 2016

(86) PCT No.: PCT/KR2016/000748
§ 371 (c)(1),
(2) Date: Dec. 23, 2016

(87) PCT Pub. No.: WO2016/117973
PCT Pub. Date: Jul. 28, 2016

(65) Prior Publication Data
US 2017/0134203 A1 May 11, 2017

(30) Foreign Application Priority Data

Jan. 23, 2015 (CN) .......................... 2015 1 0037369
Jan. 29, 2015 (CN) .......................... 2015 1 0048195

(51) Int. Cl.
*H04L 27/36* (2006.01)
*H04L 27/26* (2006.01)
*H04B 7/0456* (2017.01)

(52) U.S. Cl.
CPC ....... *H04L 27/2614* (2013.01); *H04B 7/0456* (2013.01); *H04L 27/263* (2013.01);
(Continued)

(58) Field of Classification Search
CPC ... H04L 27/3411; H04L 27/34; H04L 27/362; H04L 27/38; H04L 25/08
(Continued)

(56) References Cited

U.S. PATENT DOCUMENTS

2011/0228878 A1* 9/2011 Sorrentino ............ H04L 5/0007
375/295
2012/0243625 A1 9/2012 Berg
(Continued)

FOREIGN PATENT DOCUMENTS

WO WO 2013017930 A2 * 2/2013 ............ H04L 25/08
WO 2013152249 A1 10/2013

OTHER PUBLICATIONS

International Search Report dated May 10, 2016 in connection with International Application No. PCT/KR2016/000748, 3 pages.

*Primary Examiner* — Kevin M Burd

(57) ABSTRACT

The present disclosure relates to a communication method and system for converging a 5G communication system for supporting higher data rates beyond a 4G system with a technology for IoT. The present disclosure may be applied to intelligent services based on the 5G communication technology and the IoT-related technology, such as smart home, smart building, smart city, smart car, connected car, health care, digital education, smart retail, security and safety services. The present application discloses a method and device for transmitting and receiving signals based on a filter bank. The device comprises: a CS-DFT spreading unit for generating two data flows by applying a CS-DFT spreading operation to a first complex-value data flow input thereto; a sub-carrier mapping unit for mapping each of the two data
(Continued)

flows to corresponding sub-carriers; and an OQAM modulator for generating OQAM signals by applying an OQAM operation to the data flows mapped on sub-carriers.

23 Claims, 22 Drawing Sheets

(52) U.S. Cl.
CPC ........ *H04L 27/264* (2013.01); *H04L 27/2698* (2013.01); *H04L 27/362* (2013.01)

(58) Field of Classification Search
USPC .................................................. 375/298, 256
See application file for complete search history.

(56) References Cited

U.S. PATENT DOCUMENTS

| | | |
|---|---|---|
| 2013/0148488 A1 | 6/2013 | Gao et al. |
| 2014/0064407 A1 | 3/2014 | Dandach et al. |
| 2014/0192925 A1 | 7/2014 | Li |

* cited by examiner

[Fig. 7]
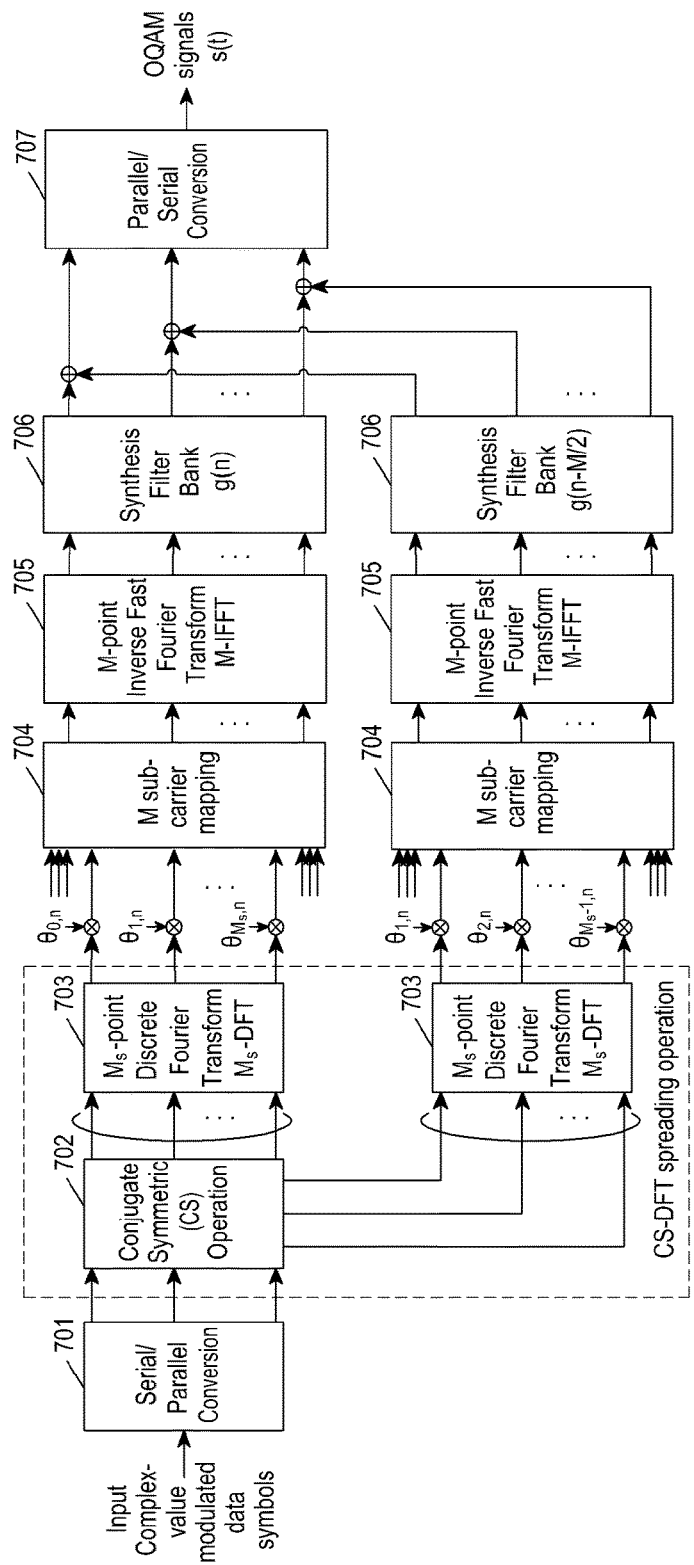

[Fig. 8]
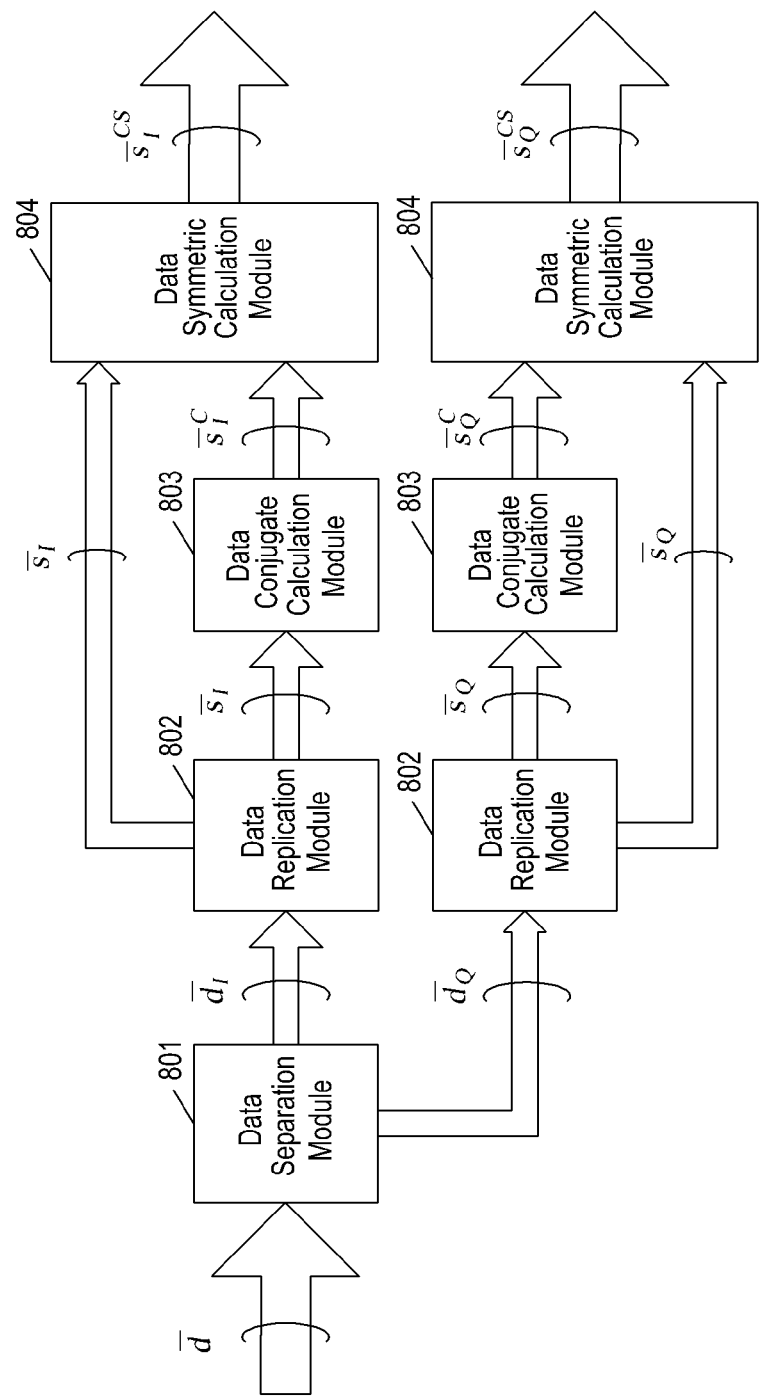

[Fig. 9]
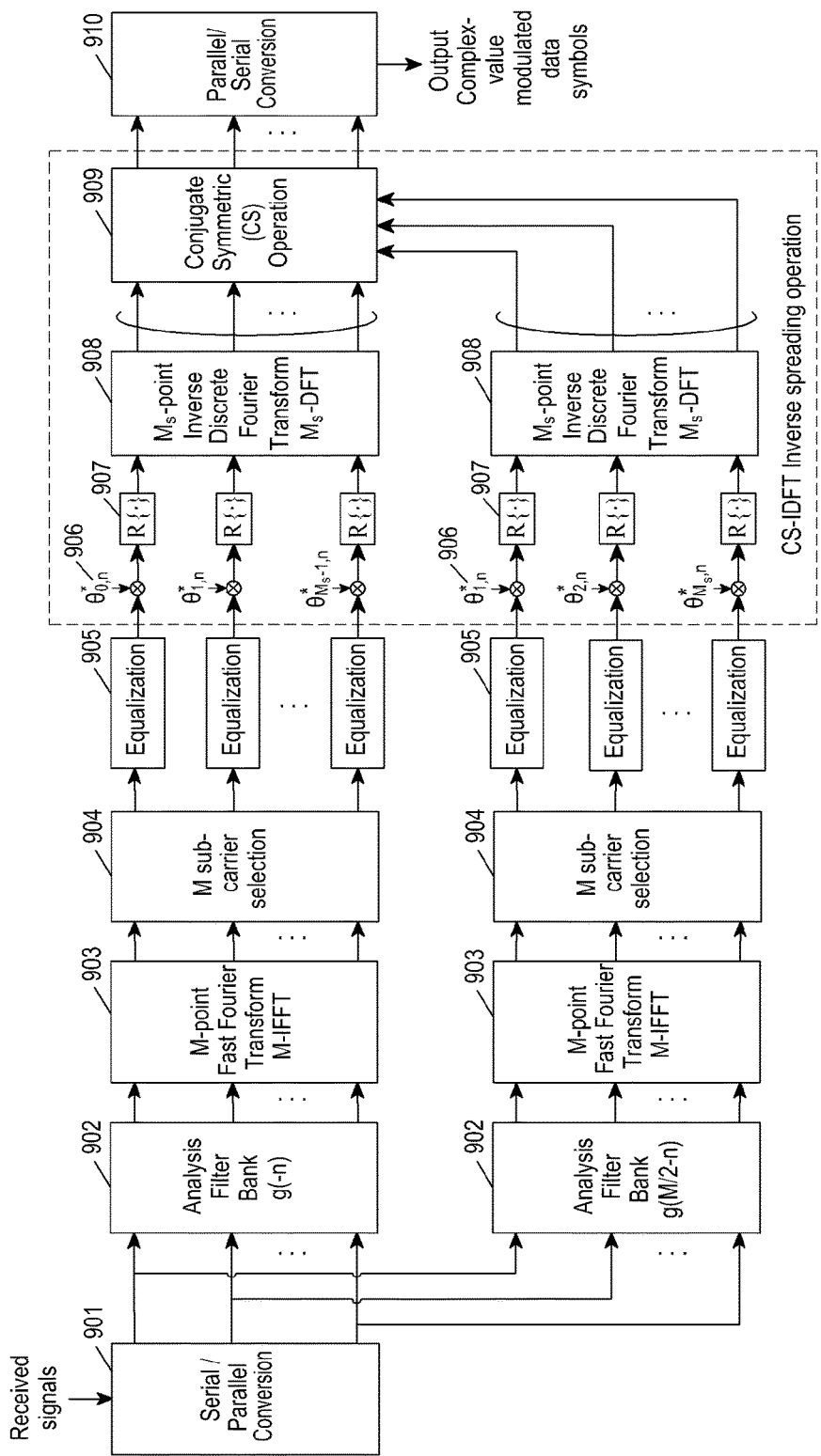

[Fig. 10]
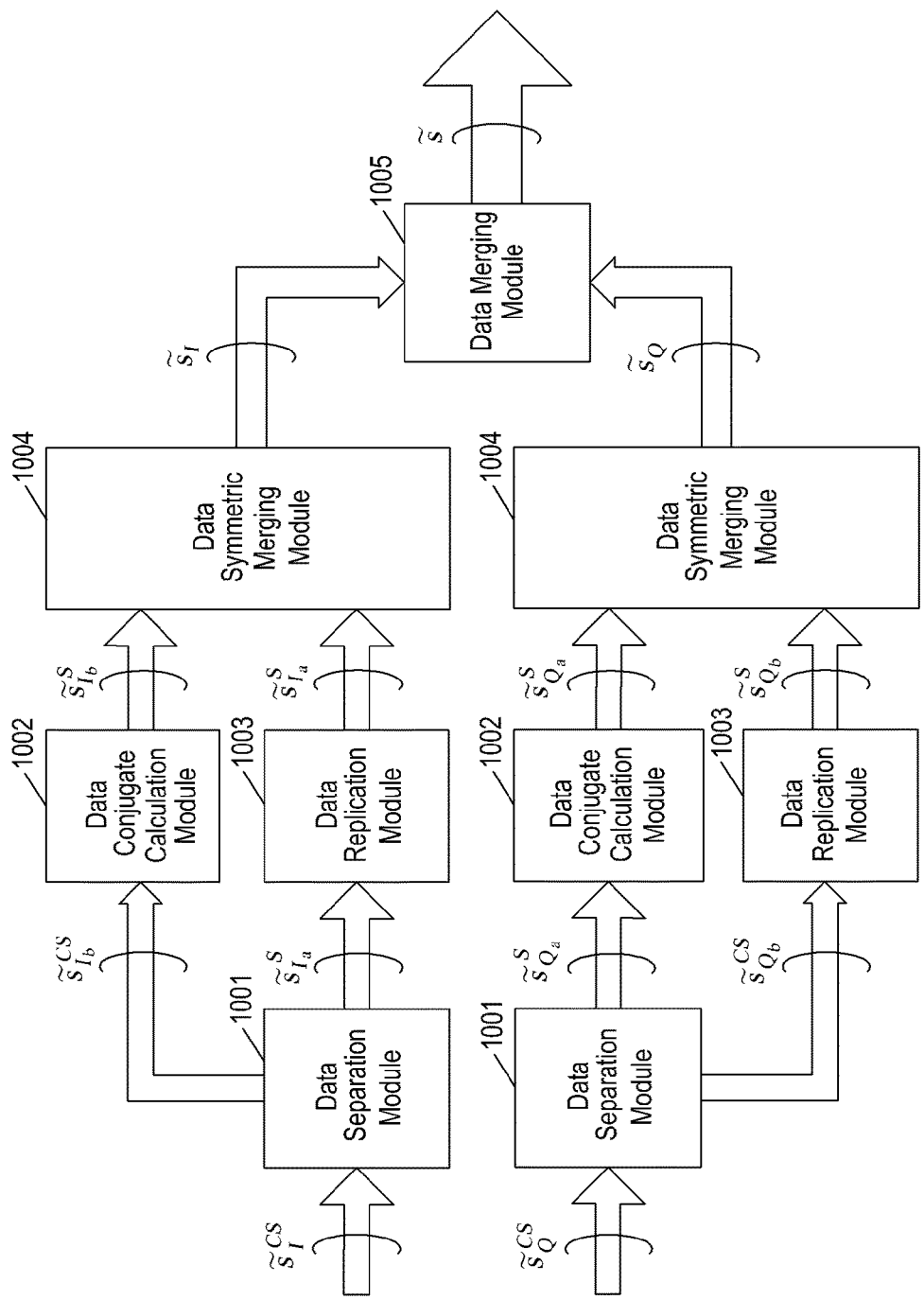

[Fig. 11]
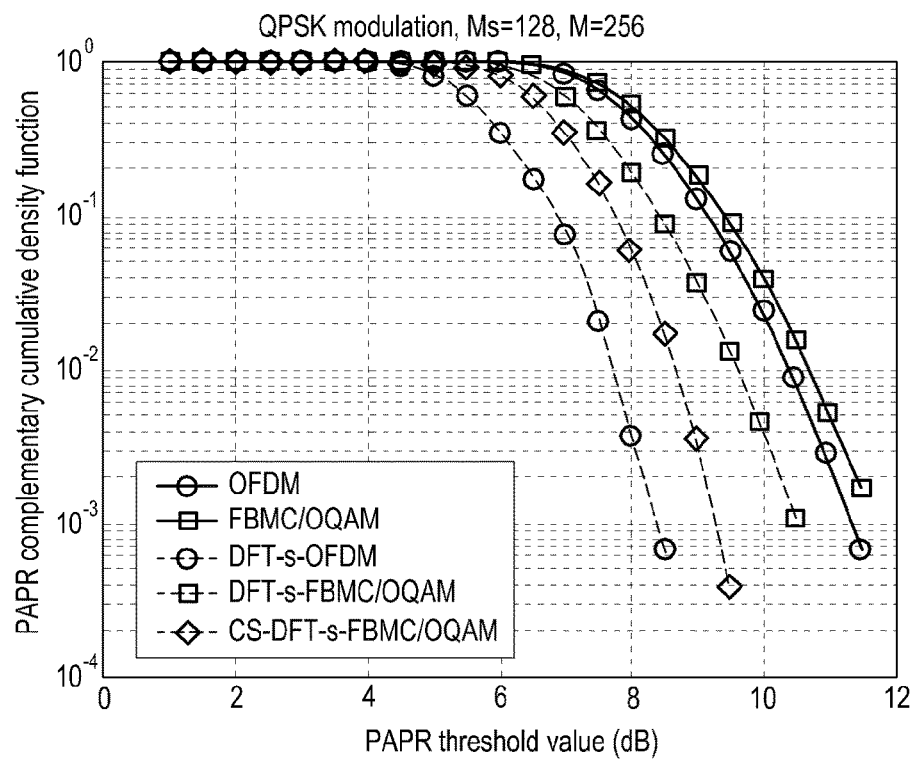

[Fig. 12]
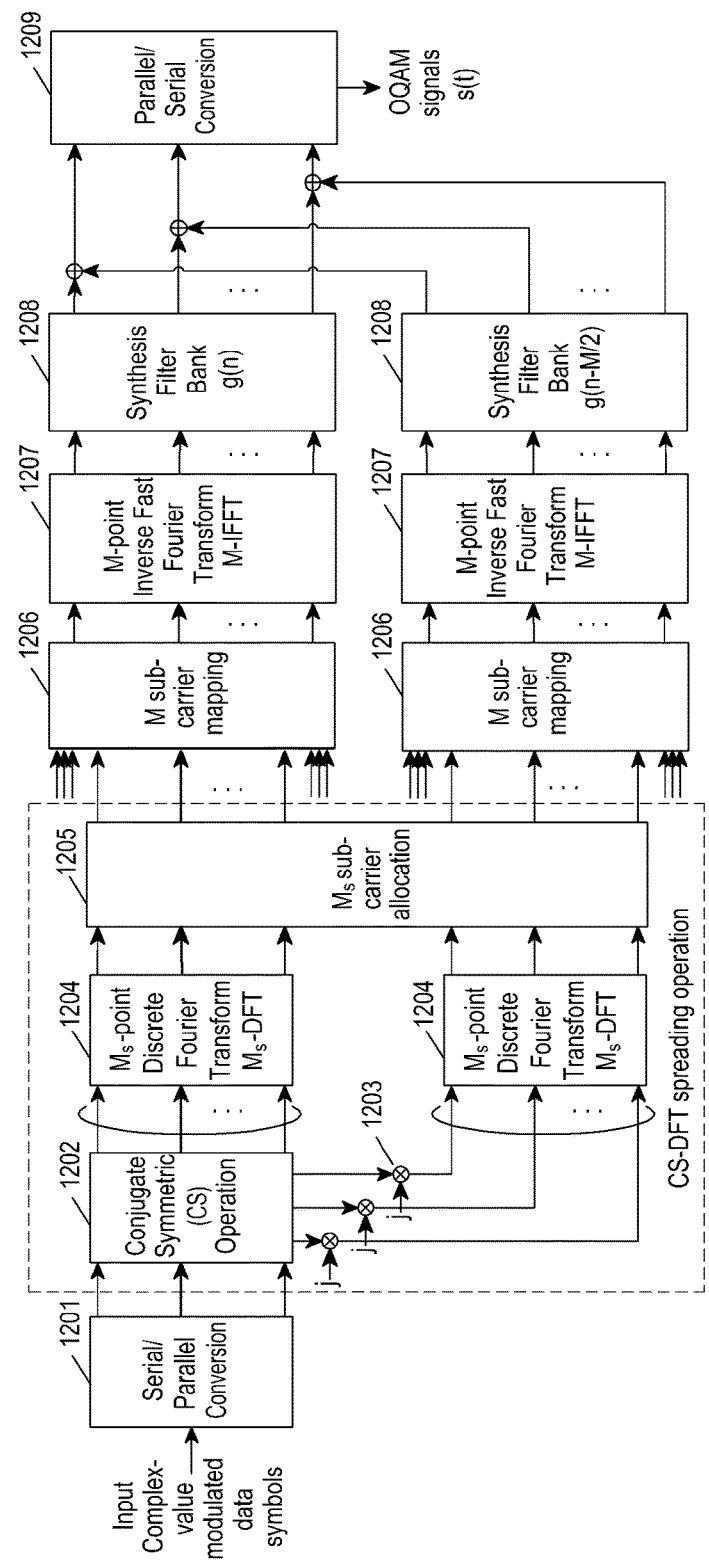

[Fig. 13]
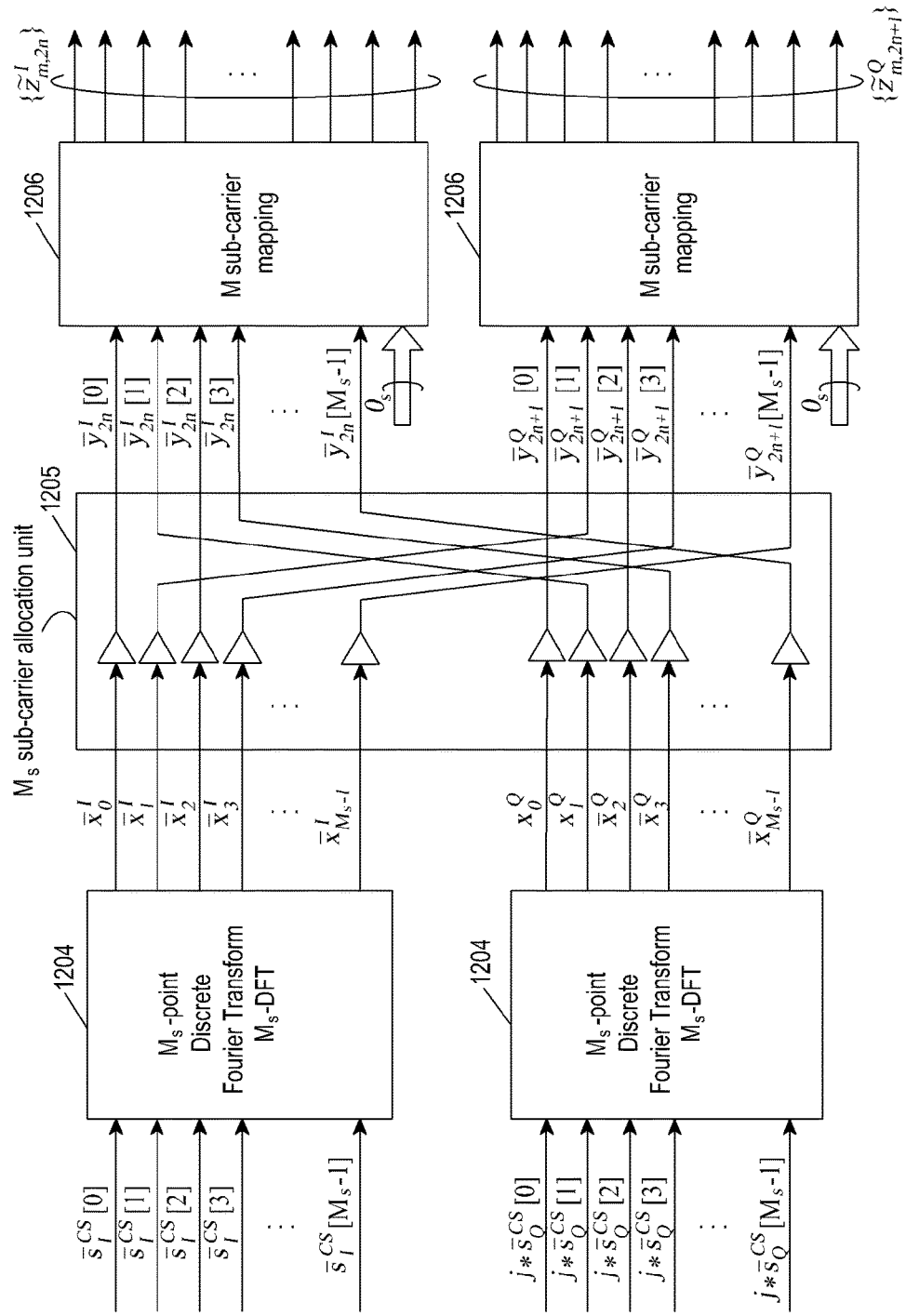

[Fig. 14]
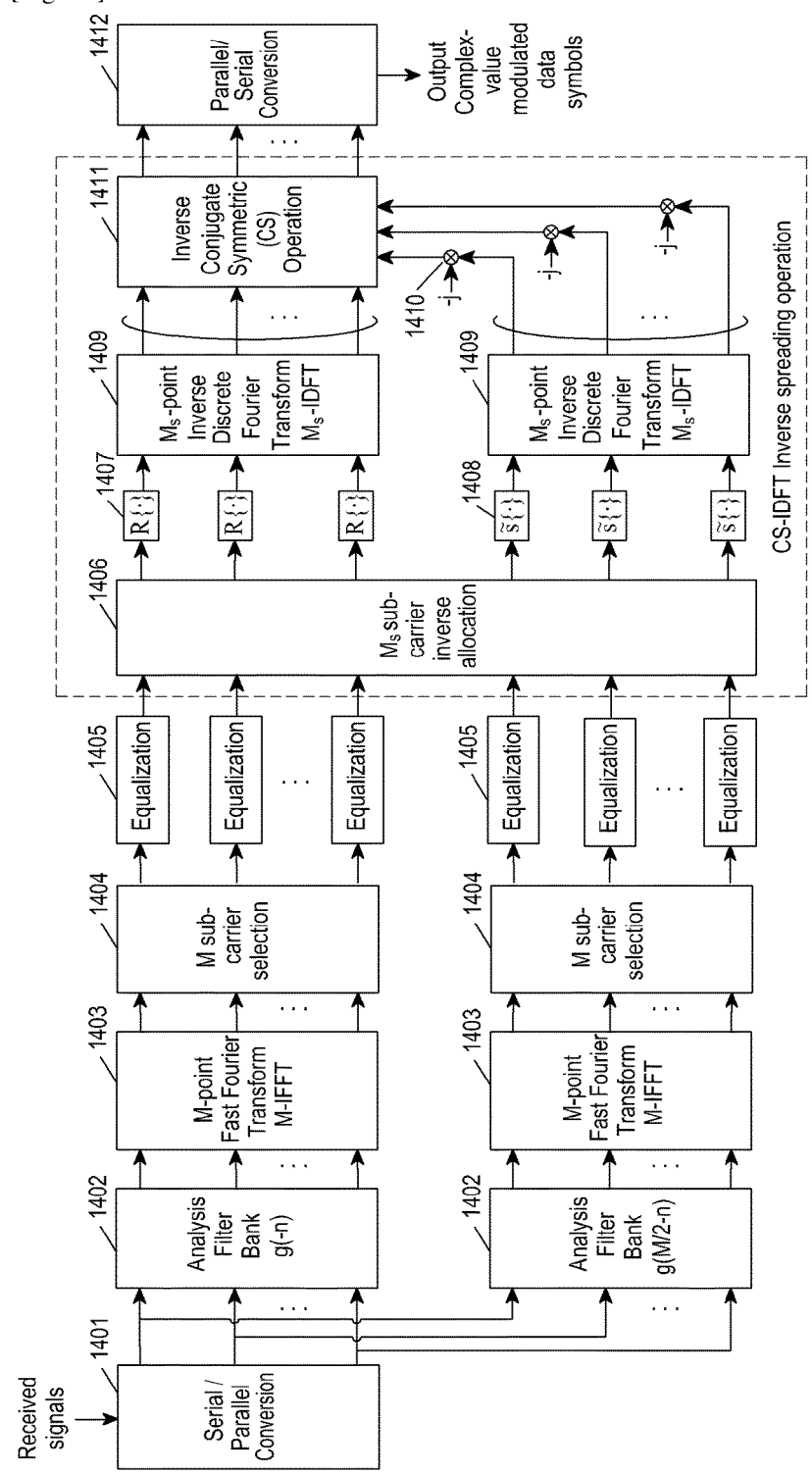

[Fig. 15]
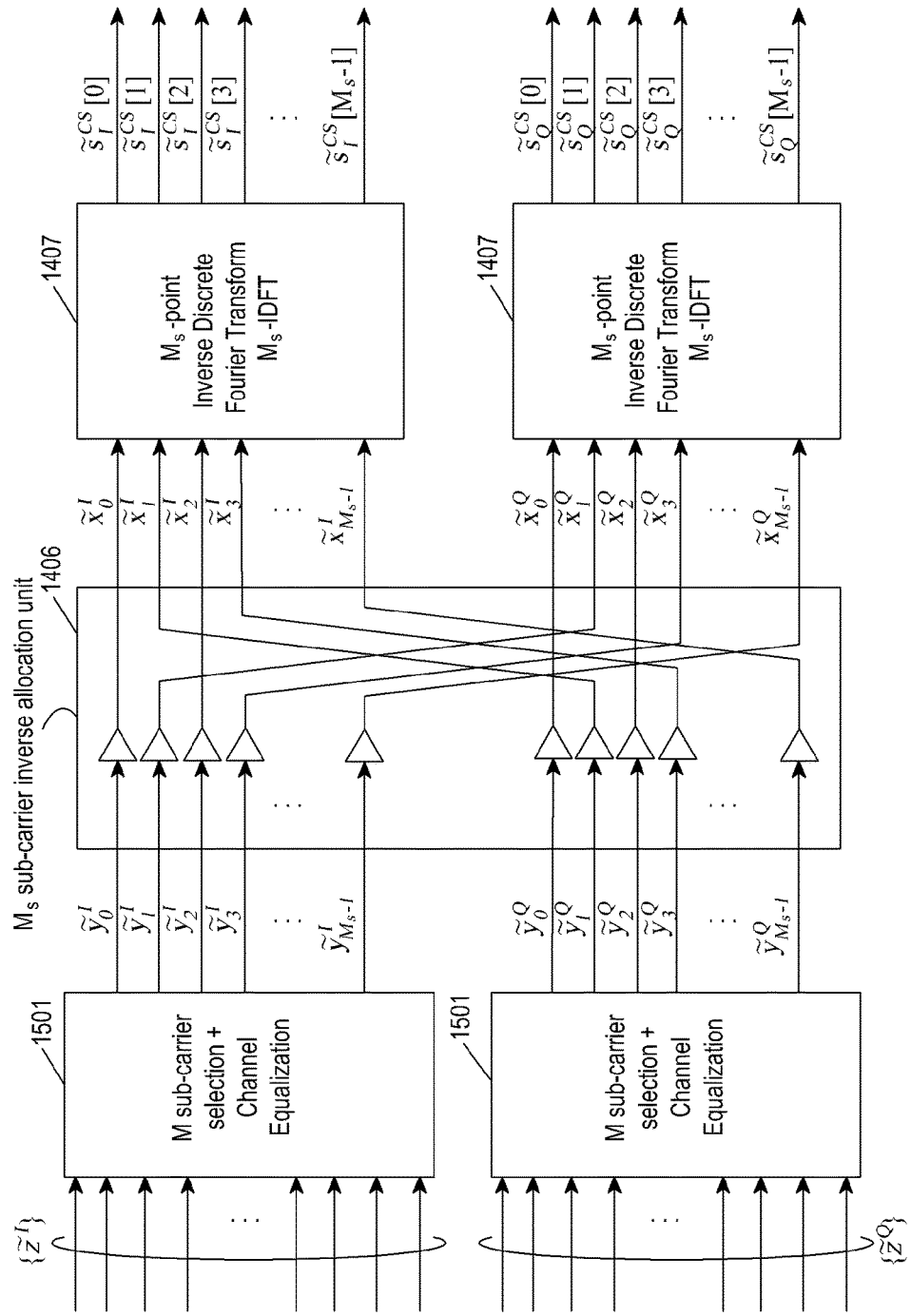

[Fig. 16]
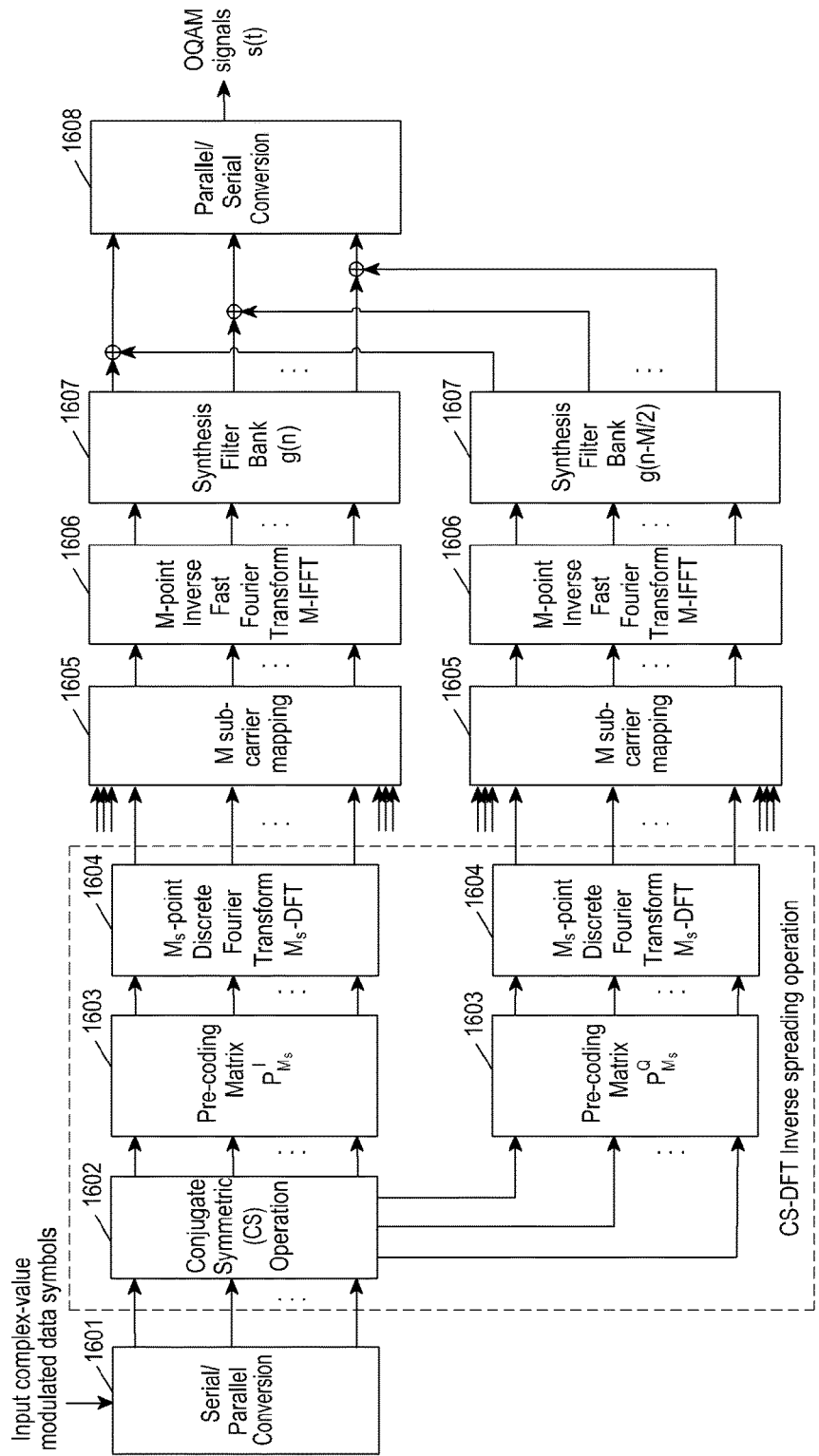

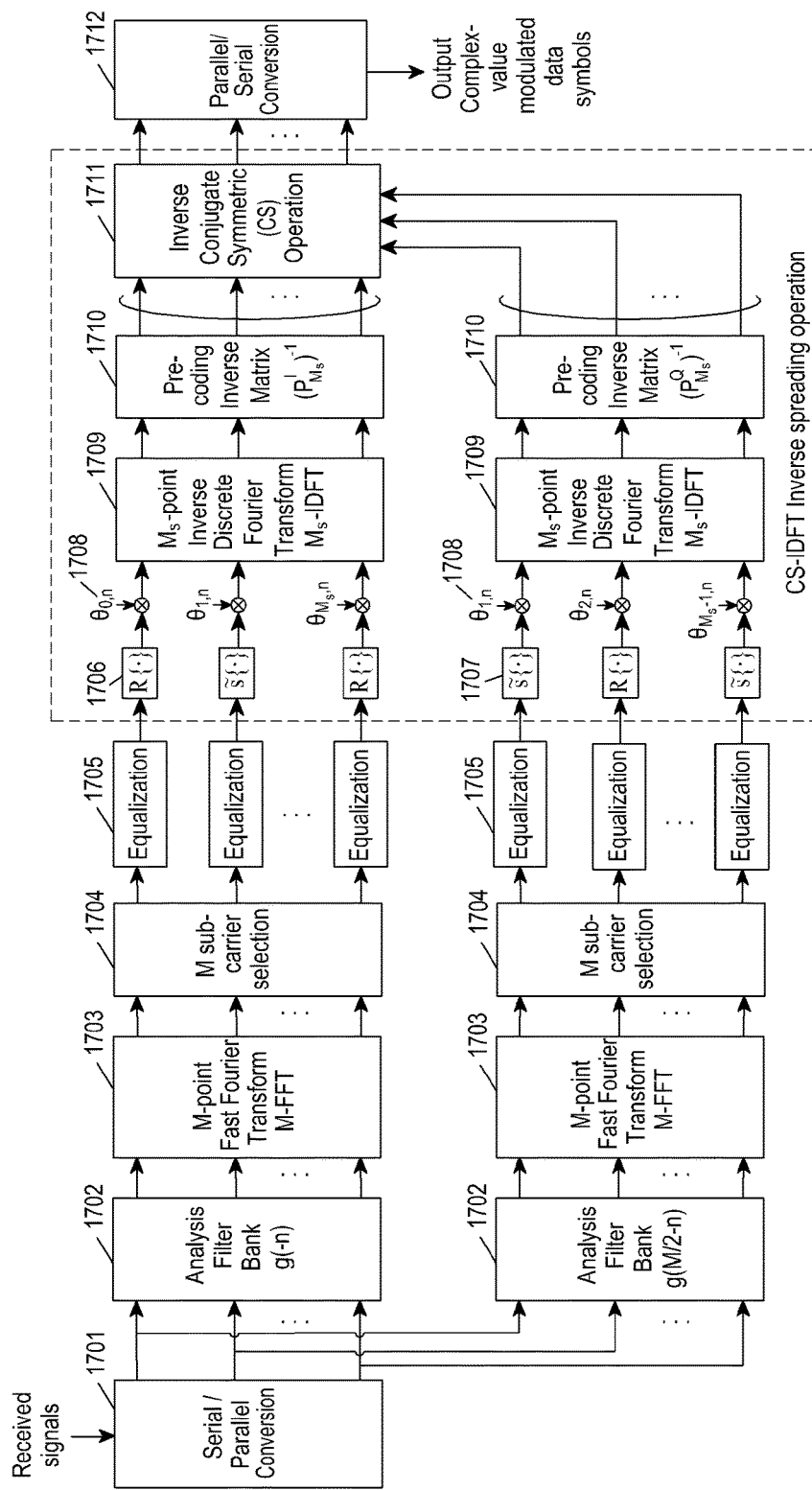
[Fig. 17]

[Fig. 18]
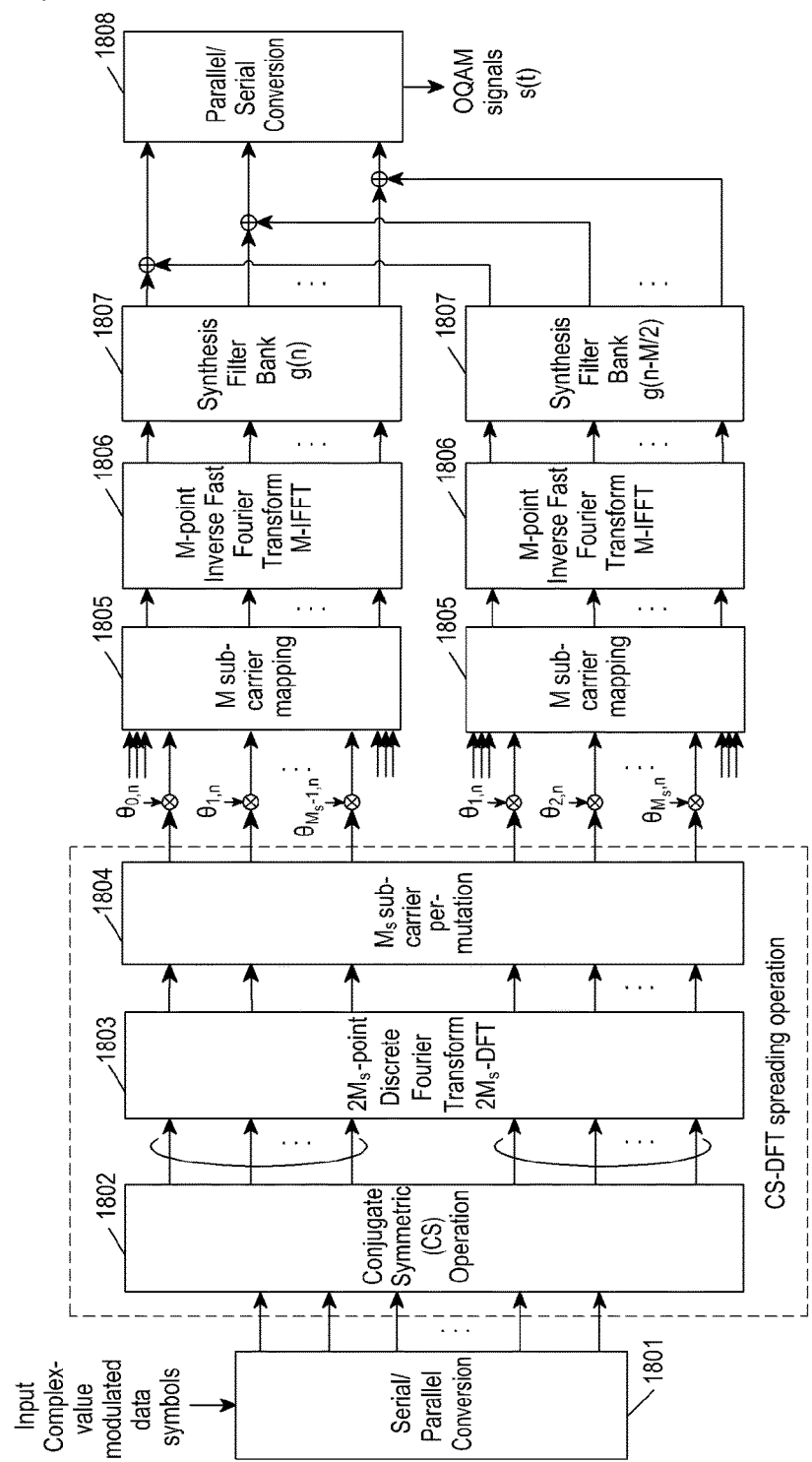

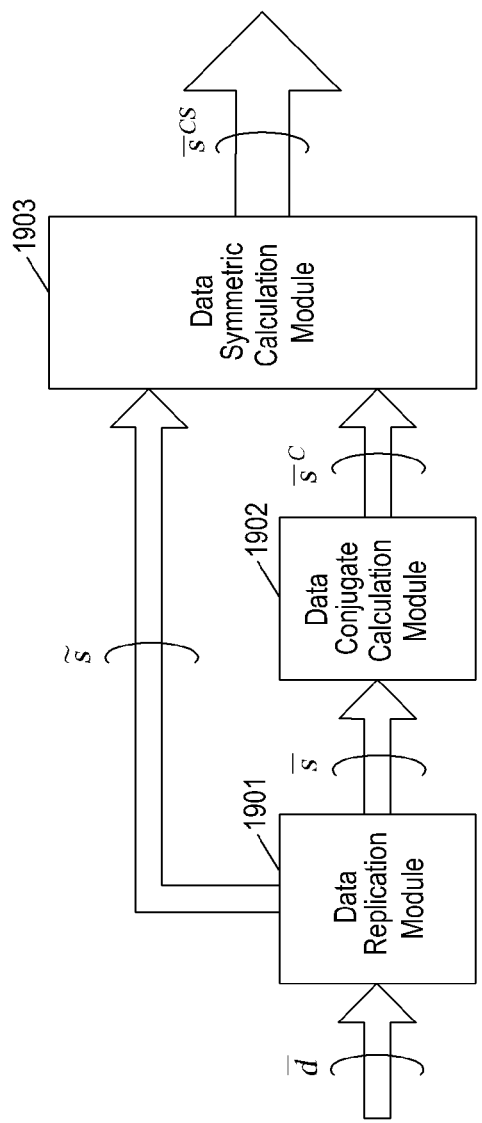
[Fig. 19]

[Fig. 20]
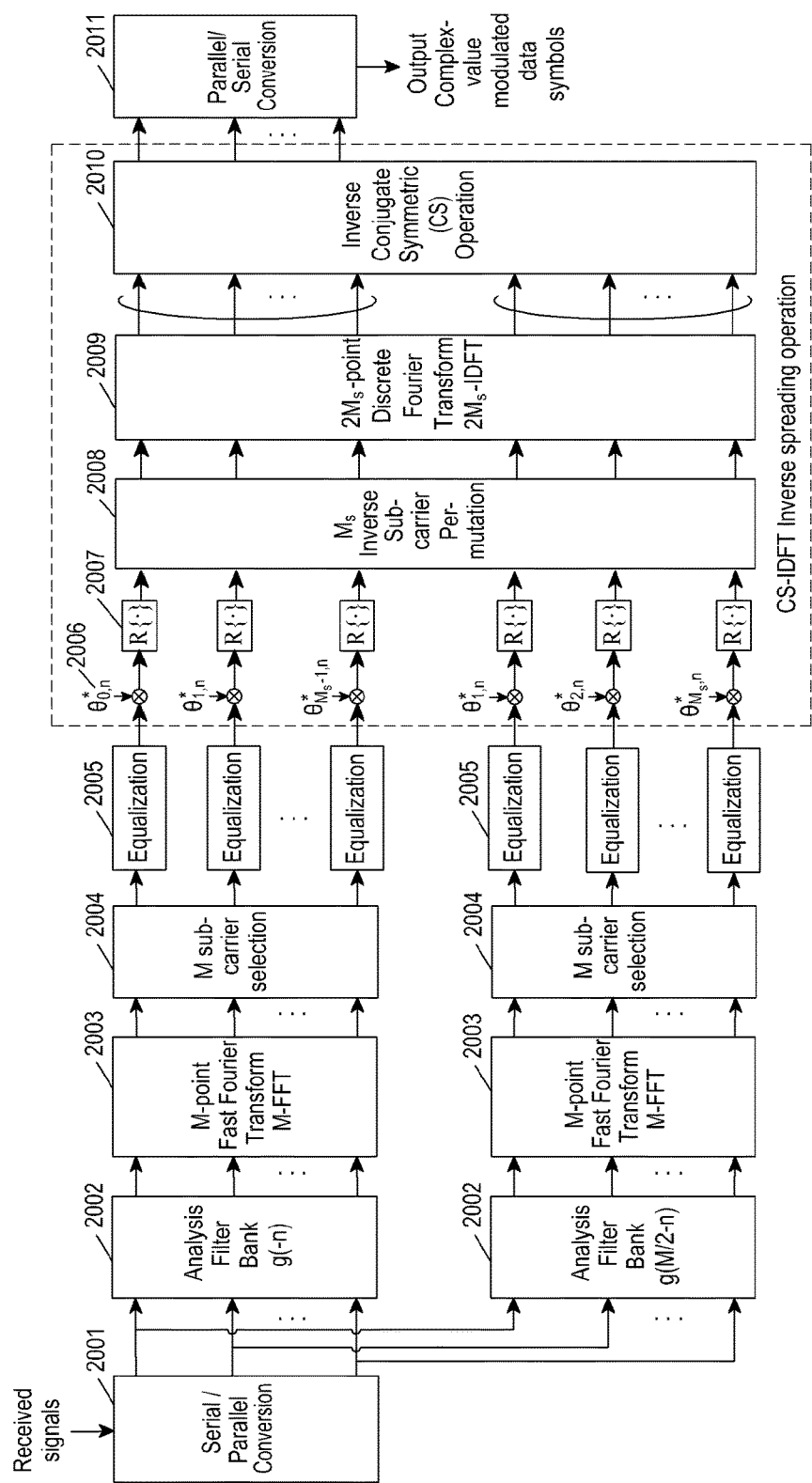

[Fig. 21]
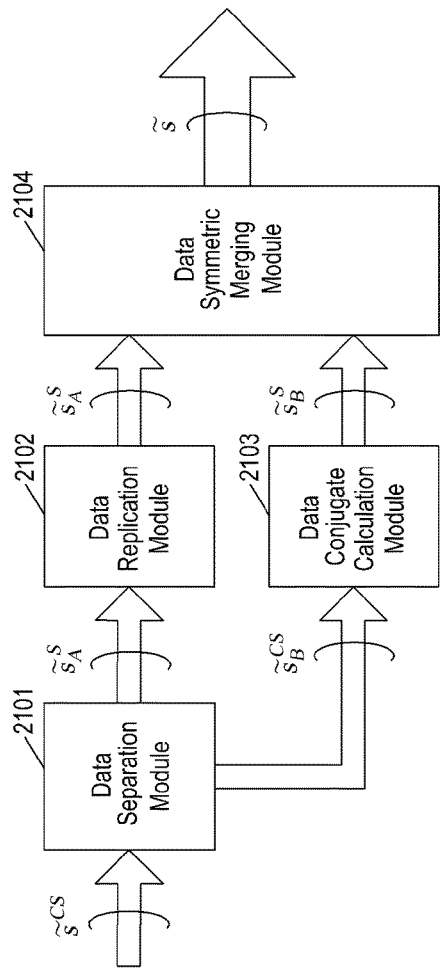
[Fig. 22]
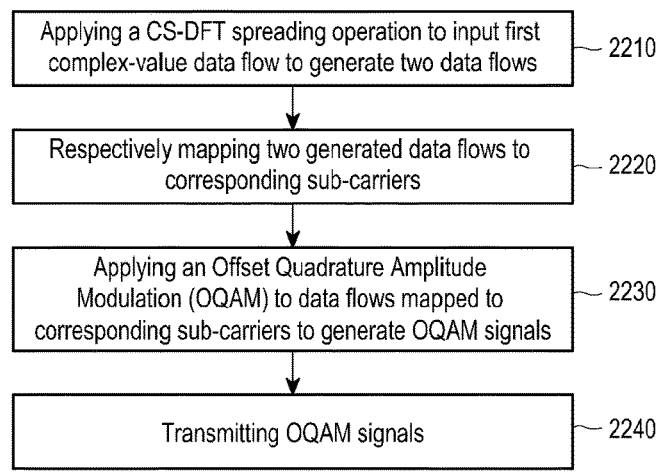

[Fig. 23]
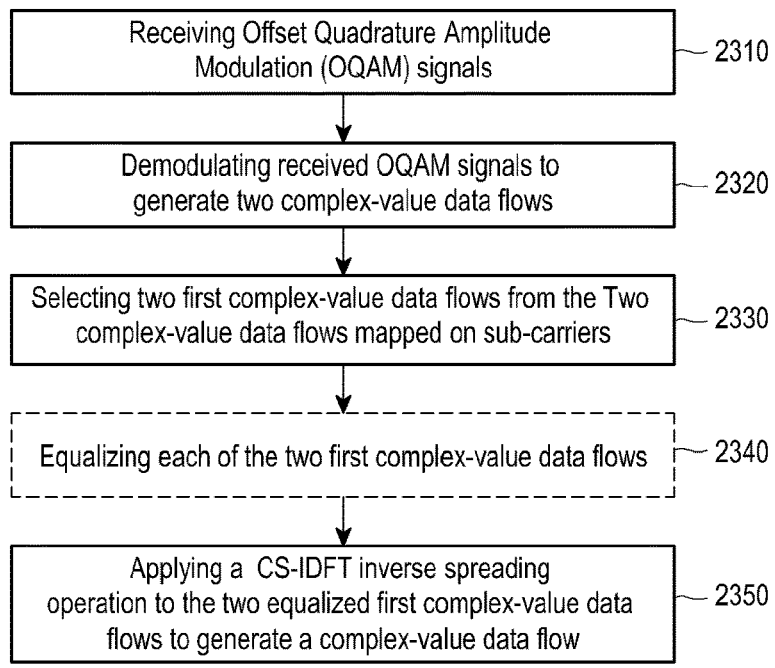
[Fig. 24]
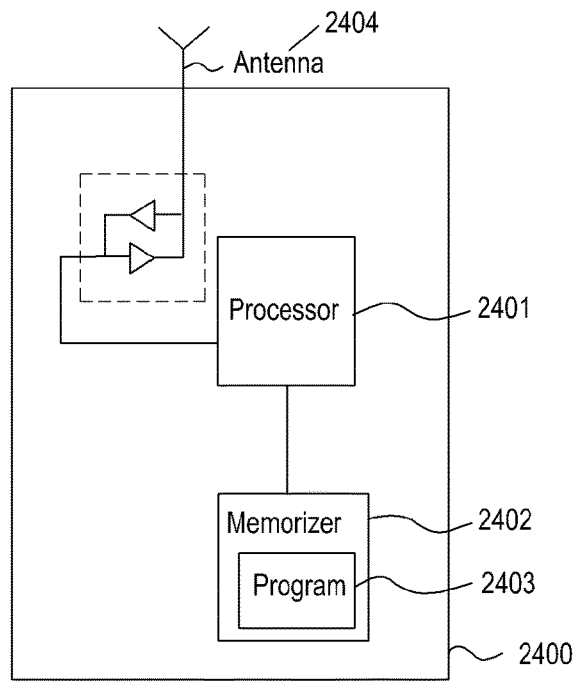

METHOD AND APPARATUS FOR GENERATING, TRANSMITTING AND RECEIVING SIGNALS BASED ON FILTER BANK IN WIRELESS COMMUNICATION SYSTEM

CROSS-REFERENCE TO RELATED APPLICATIONS AND CLAIM OF PRIORITY

The present application claims priority under 35 U.S.C. § 365 to International Patent Application No. PCT/KR2016/000748 filed Jan. 22, 2016, entitled "METHOD AND APPARATUS FOR GENERATING, TRANSMITTING AND RECEIVING SIGNALS BASED ON FILTER BANK IN WIRELESS COMMUNICATION SYSTEM", and, through International Patent Application No. PCT/KR2016/000748, to Chinese Patent Application No. 201510037369.4 filed Jan. 23, 2015 and to Chinese Patent Application No. 201510048195.1 filed Jan. 29, 2015, each of which are incorporated herein by reference into the present disclosure as if fully set forth herein.

TECHNICAL FIELD

The present application generally relates to a technical field of wireless communication technology and, more particularly, to a method and an apparatus for generating, transmitting and receiving signals based on a filter bank.

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a "beyond 4G network" or a "post LTE System".

The 5G communication system is considered to be implemented in higher frequency (mmWave) bands (e.g., 60 GHz bands) so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

Further, in the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The internet of everything (IoE) may be an example of a combination of the IoT technology and the big data processing technology through connection with a cloud server.

As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described dig data processing technology may also be considered to be an example of convergence between the 5G technology and the IoT technology.

The rapid developments of information and communications industries, especially, the increasing demands from mobile internet and IoT, bring unprecedented challenges to the mobile communications technologies. As reported in ITU-R M. [IMT.BEYOND 2020.TRAFFIC] from ITU (International Telecommunication Union), the mobile traffic is expected to grow by nearly 1000 times from year 2010 (in the era of 4G) to 2020, and the number of connecting devices will surpass 17 billion. As a massive amount of IoT equipments gradually penetrate into the mobile communication network, the number of the connecting devices will dramatically increase. In order to cope with these unprecedented challenges, the fifth-generation mobile communications technologies (5G) are being widely investigated and researched in the communication industries and in the academic community, facing the year of 2020. Currently, the framework and overall objectives of future 5G are being discussed in the report ITU-R M. [IMT.VISION], in which demand prospects, application scenarios and a variety of key performance indicators are described in detail. For new demands of 5G, the report of ITU-R M. [IMT.FUTURE TECHNOLOGY TRENDS] provides relevant information on developing trends and the like of 5G, intending to solve significant problems, such as sharp increase of the system throughput, consistency of user experience, scalability to support IoT, ultra-low latency, high energy efficiency and high cost efficiency communications, highly flexible networks, support of new services, flexible spectrum usage and the like.

Modulation waveforms and multiple access schemes are fundamentals in designing Air-Interface of mobile communications, including 5G. Currently, Orthogonal Frequency Division Multiplexing (OFDM), which is a typical representative in the family of Multi-Carrier Modulation (MCM), is widely used in fields of audio and video broadcasting as well as in terrestrial communication systems, for example, Evolved Universal Terrestrial Radio Access (E-UTRA) protocols defined by the third Generation Partnership Project (3GPP) which corresponds to the system of Long Term Evolution (LTE), Digital Video Broadcasting (DVB) and Digital Audio Broadcasting (DAB), Very-high-bit-rate Digital Subscriber Loop (VDSL), IEEE802.11a/g Wireless Local Area Network (WLAN), IEEE802.22 Wireless Regional Area Network (WRAN) and IEEE802.16 World Interoperability for Microwave Access (WiMAX) and the like. It is well-known that the basic idea of OFDM is to divide a wideband channel into a plurality of parallel narrowband sub-channels/subcarriers so that highrate data streams transmitted in frequency selective channels are transformed to lowrate data streams transmitted in a plurality of parallel independent flat-fading channels, thereby capabilities of the system to counter multipath interferences are greatly improved. Furthermore, OFDM can utilize Inverse Fast Fourier Transform/Fast Fourier Transform (IFFT/FFT) to simplify the implementation of the modulation and demodulation modules. Moreover, the insertion of Cyclic Prefix (CP) transforms the involvement of the transmitted signal with channel from a linear convolution operation to a circular convolution operation. As a result, according to the properties of a circular convolution operation, when the length of CP is greater than the largest multipath channel delay spread, the signals can be retrieved without Intersymbol Interference (ISI) by applying simple one tap frequency-domain equalization, which in turn reduces processing and implementation complexities of receivers. Although modulation waveforms based on CP-OFDM are capable of meeting the service demands of mobile broadband (MBB) in the era of 4G, there are many limitations and shortcomings of applying CP-OFDM in 5G scenarios since 5G will have to face more challenging and diversified scenarios. The said limitations and shortcomings of applying CP-OFDM in 5G mainly include:

(1) The insertion of CP for resisting ISI will greatly reduce spectrum efficiency in 5G scenarios of low latency transmissions. To be specific, the low latency transmissions will greatly shorten the length of OFDM symbols while the length of CP is only constrained by the length of impulse response of channels, and thus the ratio of the length of CP to the length of OFDM symbols will increase greatly. Such overhead results in loss of spectrum efficiency to a great extent and thus is unacceptable in such scenarios requiring low latency transmissions.

(2) Strict requirements on time synchronization will result in large signaling overheads required for maintaining the closed loop synchronization in IoT scenarios of 5G. In addition, the strict synchronization mechanism makes the design of data frame structure lack of flexibility and elasticity, and thus cannot satisfy the different synchronization requirements of a variety of services.

(3) OFDM adopts Rectangular Pulse which results in severe out-of-band leakage since this type of time domain waveform makes the side-lobes of its corresponding frequency domain counterpart roll off very slowly. This is the reason why OFDM is very sensitive to the Carrier Frequency Offset (CFO). While there will be many demands for flexible fragmented spectrums access/share in 5G, the high out-of-band leakage of OFDM greatly limits its flexibilities in designing fragmented spectrum access schemes or it needs large frequency-domain guard band, such factors reduce the spectrum efficiency accordingly.

These shortcomings are mainly due to OFDM characteristics. Although the impacts caused by these shortcomings can be reduced by adopting certain measures, it will increase the complexity of system designs, and these problems cannot be completely addressed.

Due to the problems mentioned above, as reported in ITU-R M. [IMT.FUTURE TECHNOLOGY TRENDS], some new waveform modulation technologies (Multi-carrier Modulation based) are taken into account in 5G, of which Filter Bank Multi-Carrier (FBMC) modulation becomes one of the hot research topics. As FBMC provides degrees of freedom in designing Prototype Filter, it can employ the filters with good Time/Frequency Localization (TFL) property to pulse shape the transmission waveforms, such that the transmission signals can show various preferable characteristics, comprising improvement of the spectrum efficiency since the insertion of CP is not needed to resist the ISI, lower out-of-band leakage to support flexible access of fragmented spectrums and the insensitiveness to carrier frequency offset. The typical FBMC generally employs Offset Quadrature Amplitude Modulation (OQAM) to maximize the spectrum efficiency. Therefore, such technology is generally named FBMC/OQAM system, or OFDM/OQAM system. The applications of FBMC in digital communications have been discussed in an early article entitled "Analysis and Design of OFDM/OQAM Systems Based on Filter Bank Theory" (IEEE Transactions on Signal Processing, vol. 50, no. 5, pp. 1170-1183, May 2002).

As FBMC has some advantageous characteristics which OFDM does not possess, FBMC attracts more and more attention in 5G research, but some of its inherent shortcomings challenge its applications in future mobile communication systems, and these challenges need to be solved and are being studied constantly. One of the most significant problems is that, similar to OFDM system, as a multi-carrier system, the transmit signal of an FBMC system is a superposition of signals from a plurality of sub-channels. The transmit signal may result in a relatively high peak power when the signals from these sub-channels are in-phase. Compared with single carrier system, FBMC signal thus has a relatively high Peak-to-Average Power Ratio (PAPR). As the operation range of linear high-power amplifier is limited, when the PAPR of an input signal is relatively high and goes beyond the operation range of the linear amplifier, a nonlinear amplification of the signal power will cause intermodulation interference, which will influence the signals of adjacent frequency bands and the performance of the system. In 3GPP specified LTE uplink, Single-Carrier Frequency-Division Multiple Access (SC-FDMA) is employed, which has a lower PAPR than Orthogonal Frequency-Division Multiple Access (OFDMA) used in LTE downlink. The lower PAPR allows user terminals to have better transmit power efficiency and prolongs the service life of batteries. Particularly, the generating method of SC-FDMA in frequency-domain is also known as DFT spread OFDM (DFT-s-OFDM). DFT-s-OFDM applies a DFT spreading (DFT preprocessing) operation to the signals prior to the IFFT operation in the OFDM modulation. As such, the signals transmitted by the system are time-domain signals, and thus the problem of high PAPR caused by transmitting frequency-domain signals is avoided. SC-FDMA has two advantages, property of a single carrier signal in terms of low PAPR and robustness of a multi-carrier signal against multipath fading. Therefore, SC-FDMA with CP is adopted in the uplink transmission of LTE. However, since filter banks are introduced in an FBMC system, and the length of a filter bank may be longer than that of an FBMC/OQAM symbol, the two or more adjacent symbols are overlapped in time, which makes the PAPR suppression of an FBMC system different from that of a conventional OFDM system. Therefore, in an FBMC system, if the frequency-domain DFT spreading method in SC-FDMA of LTE uplink is directly applied, the property of a single carrier signal could not be obtained and therefore, the PAPR of the system could not be efficiently reduced.

In conclusion, in order to improve the competitiveness of FBMC among candidate technologies for future 5G, it is required to address the inherent shortcomings in FBMC in addition to exploiting its advantages. For the design of uplink multiple access schemes of FBMC, it is important to develop an efficient and effective method to address the problem of high PAPR in FBMC.

DISCLOSURE OF INVENTION

Technical Problem

The technical problem to be addressed in the present application is the high PAPR in an FBMC/OQAM system. At present, there is not an effective method to reduce the PAPR in an FBMC/OQAM system. For this reason, the present application provides a signal generation method based on a Conjugate Symmetric DFT spread Filter Bank Multi-carrier (CS-DFT-s-FBMC) and a communications method and apparatus for transmitting and receiving signals. These methods make the PAPR performance of an FBMC/OQAM system comparable to that of a single carrier system meanwhile maintaining the inherent characteristics of the FBMC/OQAM system.

Solution to Problem

In a first aspect, a signal generation device is provided. The device comprises: a Conjugate Symmetric Discrete Fourier Transform (CS-DFT) spreading unit for generating two data flows by applying a CS-DFT spreading operation to a first complex-value data flow input thereto; a sub-carrier mapping unit for mapping each of the two data flows to corresponding sub-carriers; and an Offset Quadrature Amplitude Modulation (OQAM) modulator for generating OQAM signals by applying an OQAM operation to the data flows mapped on sub-carriers.

In some implementations, the CS-DFT spreading unit comprises: a conjugate symmetric operation unit for generating two conjugate symmetric complex-value data flows by applying a conjugate symmetric operation to the first complex-value data flow input thereto; and a Discrete Fourier Transform (DFT) spreading unit for generating two pure real-valued data flows by applying a DFT operation to each of the two generated conjugate symmetric complex-value data flows.

In some implementations, the OQAM modulator alternately modulates the two pure real-valued data flows onto real parts and imaginary parts of the sub-carriers on which the data flows are mapped.

In some other embodiments, the CS-DFT spreading unit comprises: a conjugate symmetric operation unit for generating two conjugate symmetric complex-value data flows by applying a conjugate symmetric operation to the first complex-value data flow input thereto; a phase rotation unit for rotating the phase of one of the two conjugate symmetric complex-value data flows; a DFT spreading unit for generating a pure imaginary-valued data flow by applying a DFT spreading operation to the complex-value data flow of which the phase is rotated, and generating a pure real-valued data flow by applying a DFT spreading operation to the other one of the generated complex-value data flows, of which the phase is rotated; and a sub-carrier allocation unit for respectively generating a real-imaginary-alternate complex-value data flow and an imaginary-real-alternate complex-value data flow by permuting and combining the pure imaginary-valued data flow and the pure real-valued data flow output from the DFT spreading unit.

In some implementations, the phase rotation unit is used for multiplying each data symbol in the first complex-value data flow with an imaginary unit j.

In some implementations, the sub-carrier allocation unit is used for generating a real-imaginary-alternate complex-value data flow and an imaginary-real-alternate complex-value data flow by exchanging the data symbols at even positions or odd positions in the pure imaginary-valued data flow and the pure real-valued data flow, respectively.

In some implementations, the OQAM modulator directly modulates the real-imaginary-alternate complex-value data flow and the imaginary-real-alternate complex-value data flow onto the mapped sub-carriers.

In some other embodiments, the CS-DFT spreading unit comprises: a conjugate symmetric operation unit for generating two conjugate symmetric complex-value data flows by applying a conjugate symmetric operation to the first complex-value data flow input thereto; a pre-coding unit for pre-coding each of the two conjugate symmetric complex-value data flows; and a DFT spreading unit for generating a real-imaginary-alternate complex-value data flow and an imaginary-real-alternate complex-value data flow by applying a DFT spreading operation to the two pre-coded complex-value data flows.

In some implementations, the pre-coding unit operates to multiply pre-coding matrixes $P_{M_s}^{I}$ and $P_{M_s}^{Q}$ to the two conjugate symmetric complex-value data flows respectively, wherein, $$P_{M_s}^{I} = F_{M_s}^{-1} \Lambda_{M_s}^{I} F_{M_s}$$

$$P_{M_s}^{Q} = F_{M_s}^{-1} \Lambda_{M_s}^{Q} F_{M_s}$$

where, $F_{M_s}$ is a DFT matrix with size of $M_s \times M_s$; $\Lambda_{M_s}^{I}$ is a diagonal matrix, of which off-diagonal elements are all 0s, diagonal elements at odd positions are all 1s, and diagonal elements at even positions are all js; and $\Lambda_{M_s}^{Q}$ is a diagonal matrix, of which off-diagonal elements are all 0s, diagonal elements at even positions are all 1s, and diagonal elements at odd positions are all js.

In some implementations, the OQAM modulator directly modulates the real-imaginary-alternate complex-value data flow and the imaginary-real-alternate complex-value data flow onto the mapped sub-carriers.

In some implementations, the conjugate symmetric operation unit comprises: a data separation module for separating the first complex-value data flow into a second complex-value data flow and a third complex-value data flow with equal length; a data replication module for replicating the second complex-value data flow and the third complex-value data flow and performing power allocation on the second complex-value data flow and the third complex-value data flow to generate two second complex-value data flows and two third complex-value data flows, respectively; a data conjugate calculation module for generating a fourth complex-value data flow and a fifth complex-value data flow by applying a conjugate calculation to each data symbol in one second complex-value data flow and one third complex-value data flow from the data replication module; and a data symmetry calculation module for generating a first conjugate symmetric complex-value data flow by rotating the other second complex-value data flow from the data replication module or one fourth complex-value data flow from the data conjugate calculation module, and combining the rotated one of the other second complex-value data flow and the one fourth complex-value data flow with the other one of the other second complex-value data flow and the one fourth complex-value data flow, and wherein the data symmetry calculation module is further configured for generating a second conjugate symmetric complex-value data flow by rotating the other third complex-value data flow from the data replication module or one fifth complex-value data flow from the data conjugate calculation module, and combining the rotated one of the other third complex-value data flow and the one fifth complex-value data flow with the other one of the other third complex-value data flow and the one fifth complex-value data flow.

In some embodiments, the CS-DFT spreading unit comprises: a conjugate symmetric operation unit for generating a conjugate symmetric complex-value data flow by applying a conjugate symmetric operation to the first complex-value data flow input thereto; a DFT spreading unit for generating a pure real-valued data flow by applying a DFT spreading operation to the conjugate symmetric complex-value data flow; and a sub-carrier permutation unit for adjusting the position of each data symbol in the pure real-valued data flow in a predetermined manner and dividing the data symbols after position adjustment into two pure real-valued data flows with equal length.

In some implementations, the OQAM modulator alternately modulates the two pure real-valued data flows with equal length onto real parts and imaginary parts of the mapped sub-carriers.

In some implementations, the conjugate symmetric operation unit comprises: a data replication module for replicating the first complex-value data flow and performing power allocation on the replicated first complex-value data flow to generate two sixth complex-value data flows; a data conjugate calculation module for generating a seventh complex-value data flow by applying a conjugate calculation to each data symbol in one sixth complex-value data flow from the data replication module; and a data symmetric calculation module for generating a conjugate symmetric complex-value data flow by rotating the other sixth complex-value data flow from the data replication module or the seventh complex-value data flow from the data conjugate calculation module, and combining the rotated one of the sixth complex-value data flow and the seventh complex-value data flow with the other of the sixth complex-value data flow and the seventh complex-value data flow.

In some implementations, the data symmetry calculation module is also used for executing zero padding operation during the combining.

In some implementations, the data symmetry calculation module executes zero padding operation by: executing directly zero padding at the DC component in the generated conjugate symmetric complex-value data flows; or executing, respectively, zero padding at front of the two complex-value data flows to be combined.

In the second aspect, a transmitter is provided. Said transmitter comprises: a signal generating device of any one of claims 1 to 16 for generating OQAM signals; and an antenna for transmitting the OQAM signals.

In the third aspect, a receiver is provided. Said receiver comprises: an antenna for receiving Offset Quadrature Amplitude Modulation (OQAM) signals; an OQAM demodulator for generating two complex-value data flows by demodulating the received OQAM signals; a sub-carrier selection unit for selecting two first complex-value data flows from the two complex-value data flows on mapped sub-carriers; and a conjugate symmetric Inverse Discrete Fourier Transform (CS-IDFT) inverse spreading unit for generating a complex-value data flow by applying a CS-IDFT to the two first complex-value data flows.

In some embodiments, the CS-IDFT inverse spreading unit comprises: a phase rotation unit for applying phase rotations to each of the two first complex-value data flows to generate two second complex-value data flows; a real/imaginary part extraction unit for extracting a real part of each data symbol in the two second complex-value data flows; an Inverse Discrete Fourier Transform (IDFT) spreading unit for generating two third complex-value data flows by applying an IDFT to each of the real part of the two second complex-value data flows; and an inverse conjugate symmetric operation unit for generating a complex-value data flow by applying an inverse conjugate symmetric operation to the two third complex-value data flows.

In some implementations, the phase rotation unit is used for alternately multiplying each data symbol in one of the two first complex-value data flows with 1 and $-j$ and alternately multiplying each data symbol in the other one of the two first complex-value data flows with $-j$ and 1.

In some other embodiments, the CS-IDFT inverse spreading unit comprises: a sub-carrier inverse allocation unit for permuting and combining the two first complex-value data flows to generate two fourth complex-value data flows; a real/imaginary part extraction unit for extracting real parts of one of the two fourth complex-value data flows and extracting imaginary parts of the other one of the two fourth complex-value data flows; an IDFT spreading unit for generating two fifth complex-value data flows by applying an IDFT to the real parts and imaginary parts extracted from the two fourth complex-value data flows, respectively; a phase rotation unit for rotating a phase in one of the two fifth complex-value data flows; and an inverse conjugate symmetric operation unit for generating a complex-value data flow by applying an inverse conjugate symmetric operation to one of the two fifth complex-value data flows whose phase is rotated and the other one of the two fifth complex-value data flows whose phase is not rotated.

In some implementations, the phase rotation unit is used for multiplying each data symbol in one of the two fifth complex-value data flows, of which the imaginary parts are extracted and to which IDFT is applied, with $-j$.

In some implementations, the sub-carrier inverse allocation unit is used for generating the two fourth complex-value data flows by exchanging the data symbols at even positions or odd positions in the two first complex-value data flows.

In some other embodiments, the CS-IDFT inverse spreading unit comprises: a real/imaginary part extraction unit for alternately extracting real parts and imaginary parts of the two first complex-value data flows; a phase rotation unit for adjusting the phases of the real parts and imaginary parts extracted from the two first complex-value data flows to generate two sixth complex-value data flows; an IDFT spreading unit for generating two seventh complex-value data flows by applying IDFT to the two sixth complex-value data flows, respectively; an inverse pre-coding unit for generating two eighth complex-value data flows by applying an inverse pre-coding operation to the two seventh complex-value data flows, respectively; and an inverse conjugate symmetric operation unit for generating a complex-value data flow by applying an inverse conjugate symmetric operation to the two eighth complex-value data flows.

In some implementations, the phase rotation unit is used for multiplying the real parts extracted from the two first complex-value data flows with 1 and multiplying the imaginary parts extracted from the two first complex-value data flows with an imaginary unit j.

In some implementations, an encoding matrix applied by the inverse pre-coding unit is an inverse matrix or a conjugate transpose matrix of the pre-coding matrix used in a pre-coding operation of a transmitter.

In some implementations, the inverse conjugate symmetric operation unit comprises: a data separation unit for separating the two complex-value data flows input thereto into two eighth complex-value data flows with equal length and two ninth complex-value data flows with equal length; a data replication module for replicating one eighth complex-value data flow and one ninth complex-value data flow and outputting the replicated complex-value data flow to a data symmetric merging module; a data conjugate calculation module for generating a tenth complex-value data flow and an eleventh complex-value data flow by applying a conjugate calculation to each data symbol in the other eighth complex-value data flow and the other two ninth complex-value data flows, respectively; a data symmetric merging module for generating a first inverse conjugate symmetric complex-value data flow by rotating the one eighth complex-value data flow from the data replication module or the tenth complex-value data flow, and merging the rotated one of the one eighth complex-value data flow and the tenth complex-value data flow with the other one of the one eighth complex-value data flow and the tenth complex-value data flow, and for generating a second inverse conjugate symmetric complex-value data flow by rotating one ninth complex-value data flow from the data replication module or the eleventh complex-value data flow, and merging the rotated one of the one ninth complex-value data flow and the eleventh complex-value data flow with the other one of the one ninth complex-value data flow and the eleventh complex-value data flow; and a data merging module, used for merging the first conjugate symmetric complex-value data flow with the second conjugate symmetric complex-value data flow to generate a complex-value data flow.

In some embodiments, the CS-IDFT inverse spreading unit comprises: a phase rotation unit for rotating a phase of each of the two first complex-value data flows to generate two twelfth complex-value data flows; a real/imaginary part extraction unit for extracting a real part of each data symbol in the two twelfth complex-value data flows; an inverse sub-carrier permutation unit for permuting and combining real parts extracted from the two twelfth complex-value data flows to generate a thirteenth complex-value data flow; an IDFT spreading unit for generating a fourteenth complex-value data flow by applying an IDFT to one of the two twelfth complex-value data flows; and an inverse conjugate symmetric operation unit for generating a complex-value data flow by applying an inverse conjugate symmetric operation to the fourteenth complex-value data flow.

In some implementations, the inverse conjugate symmetric operation unit comprises: a data separation module for separating the fourteenth complex-value data flow into a fifteenth complex-value data flow with equal length and a sixteenth complex-value data flow with equal length; a data replication module for replicating the fifteenth complex-value data flow and outputting the replicated complex-value data flow to a data symmetric merging module; a data conjugate calculation module for generating a seventeenth complex-value data flow by applying a conjugate calculation to each data symbol in the sixteenth complex-value data flow; and a data symmetric merging module for generating a complex-value data flow by rotating the fifteenth complex-value data flow from the data replication module or the seventeenth complex-value data flow, and merging the rotated one of the fifteenth complex-value data flow and the seventeenth complex-value data flow with the other one of the fifteenth complex-value data flow and the seventeenth complex-value data flow.

In the fourth aspect, a method for generating signals is provided. Said method comprises: generating two data flows by applying a CS-DFT spreading operation to the first complex-value data flow; mapping the two data flows to corresponding sub-carriers, respectively; and generating Offset Quadrature Amplitude Modulation (OQAM) signals by applying OQAM to the data flows mapped on sub-carriers.

In the fifth aspect, a method for transmitting signals is provided. Said method comprises: generating OQAM signals according to the method of claim 30; and transmitting the OQAM signals.

In the sixth aspect, a method for receiving signals is provided. Said method comprises: receiving Offset Quadrature Amplitude Modulation (OQAM) signals; demodulating the received OQAM signals to generate two complex-value data flows; selecting the two first complex-value data flows from the two complex-value data flows on mapped sub-carriers; and generating a complex-value data flow by applying a CS-IDFT inverse spreading operation to the two first complex-value data flows.

The implementations of the present application make the PAPR performance of an FBMC/OQAM system comparable to that of a single carrier transmission while maintaining the inherent characteristics of the FBMC/OQAM system.

BRIEF DESCRIPTION OF DRAWINGS

Further features, objects and advantages of the present application will be more apparent with a review of a detailed description of the non-limiting embodiments set forth below with reference to the attached drawings.

FIG. 7 is a block diagram illustrating an example of a configuration of a transmitter in a Conjugate Symmetric DFT spread FBMC/OQAM (CS-DFT-s-FBMC/OQAM) system according to a first embodiment of the present application.

FIG. 8 is a flow chart of applying a Conjugate Symmetric (CS) operation to given data symbols according to the first embodiment of the present application.

FIG. 9 is a block diagram illustrating an example of a configuration of a receiver in a Conjugate Symmetric DFT spread FBMC/OQAM (CS-DFT-s-FBMC/OQAM) system according to the first embodiment of the present application.

FIG. 10 is a flow chart of applying an inverse Conjugate Symmetric (CS) operation to given data symbols according to the first embodiment of the present application.

FIG. 11 illustrates simulation results of the complementary cumulative density function of the PAPR in a CS-DFT-s-FBMC/OQAM system according to the first embodiment of the present application.

FIG. 12 is a block diagram illustrating an example of a configuration of a transmitter in a Conjugate Symmetric DFT spread FBMC/OQAM (CS-DFT-s-FBMC/OQAM) system according to a second embodiment of the present application.

FIG. 13 is a diagram for explaining an example of applying a sub-carrier allocation operation to given data symbols according to the second embodiment of the present application.

FIG. 14 is a block diagram illustrating an example of a configuration of a receiver in a Conjugate Symmetric DFT spread FBMC/OQAM (CS-DFT-s-FBMC/OQAM) system according to the second embodiment of the present application.

FIG. 15 is a diagram for explaining an example of a sub-carrier inverse allocation operation to given data symbols according to the second embodiment of the present application.

FIG. 16 is a block diagram illustrating an example of a configuration of a transmitter in a CS-DFT-s-FBMC/OQAM system according to a third embodiment of the present application.

FIG. 17 is a block diagram illustrating an example of a configuration of a receiver in a CS-DFT-s-FBMC/OQAM system according to the third embodiment of the present application.

FIG. 18 is a block diagram illustrating an example of a configuration of a transmitter in a CS-DFT-s-FBMC/OQAM system according to a fourth embodiment of the present application.

FIG. 19 is a diagram for explaining an example of applying a Conjugate Symmetric (CS) operation to given data symbols according to the fourth embodiment of the present application.

FIG. 20 is a block diagram illustrating an example of a configuration of a receiver in a CS-DFT-s-FBMC/OQAM system according to the fourth embodiment of the present application.

FIG. 21 is a diagram for explaining an example of an inverse Conjugate Symmetric (CS) operation to given data symbols according to the fourth embodiment of the present application.

FIG. 22 is a flow chart illustrating an example of a method of transmitting Conjugate Symmetric DFT spread FBMC/OQAM (CS-DFT-s-FBMC/OQAM) signals according to a plurality of embodiments of the present application.

FIG. 23 is a flow chart illustrating an example of a method of receiving Conjugate Symmetric DFT spread FBMC/OQAM (CS-DFT-s-FBMC/OQAM) signals according to a plurality of embodiments of the present application.

FIG. 24 is a block diagram illustrating an entity applicable to a transmitter or receiver according to a plurality of embodiments of the present application.

MODE FOR THE INVENTION

Hereinafter, the embodiments of the present application will be further explained in detail with reference to the accompanying drawings in order to make the purposes, technical solutions and advantages of the present application more clear. It should be understood that specific embodiments described herein are intended to explain the relevant invention, rather than to limit the invention. In addition, it should be noted that only a portion related to the present invention is shown in the accompanying drawings for ease of description.

Provided that there is no conflict, it should be noted that the embodiments, and features in the embodiments of the present application may be combined. Hereinafter, the present application will be explained in detail with reference to the accompanying drawings in connection with the embodiments.

A signal waveform having good Time/Frequency Localization (TFL) characteristics can be obtained by Filter Bank Multi-Carrier (FBMC) modulation, in which the corresponding prototype filter banks can be designed based on isotropic orthogonal transform algorithm (IOTA), extended Gaussian function (EGF) and European PHYDYAS and so on. That is, the FBMC system employs prototype filter banks with good TFL properties to pulse shape the signals on each sub-carrier such that: 1) the FBMC can greatly suppress the ISI resulted from multipath fading channel without the insertion of CP, which not only results in higher spectrum efficiency and energy efficiency relative to OFDM, but also exhibits robust and reliable receiving performance under relatively large timing synchronization errors, which in turn allows asynchronous transmissions and receptions; and 2) with good Time/Frequency Localization property, the FBMC can transmit signals in extremely narrow frequency band and keep a very low out-of-band leakage which reduces the inter-carrier interference (ICI) resulted from Doppler spread and the phase noise. Therefore, the FBMC has great usage potential in cognitive radios, fragmented spectrum access and asynchronous transmission and the like.

In order to achieve the maximum spectrum efficiency of the FBMC, the Offset Quadrature Amplitude Modulation (OQAM) is generally employed, which is referred to as FBMC/OQAM or OFDM/OQAM (OQAM is used hereafter in short). In FBMC/OQAM, one QAM symbol is divided into two symbols, and these two symbols are alternately modulated onto the real and imaginary parts of a given sub-carrier respectively, and transmitted with a time offset. At a receiving end, if the channel fading and noise are not taken into account, the transmitted signal can be recovered by alternately extracting the real and imaginary parts of the received signal on each sub-carrier.

Figure 1:
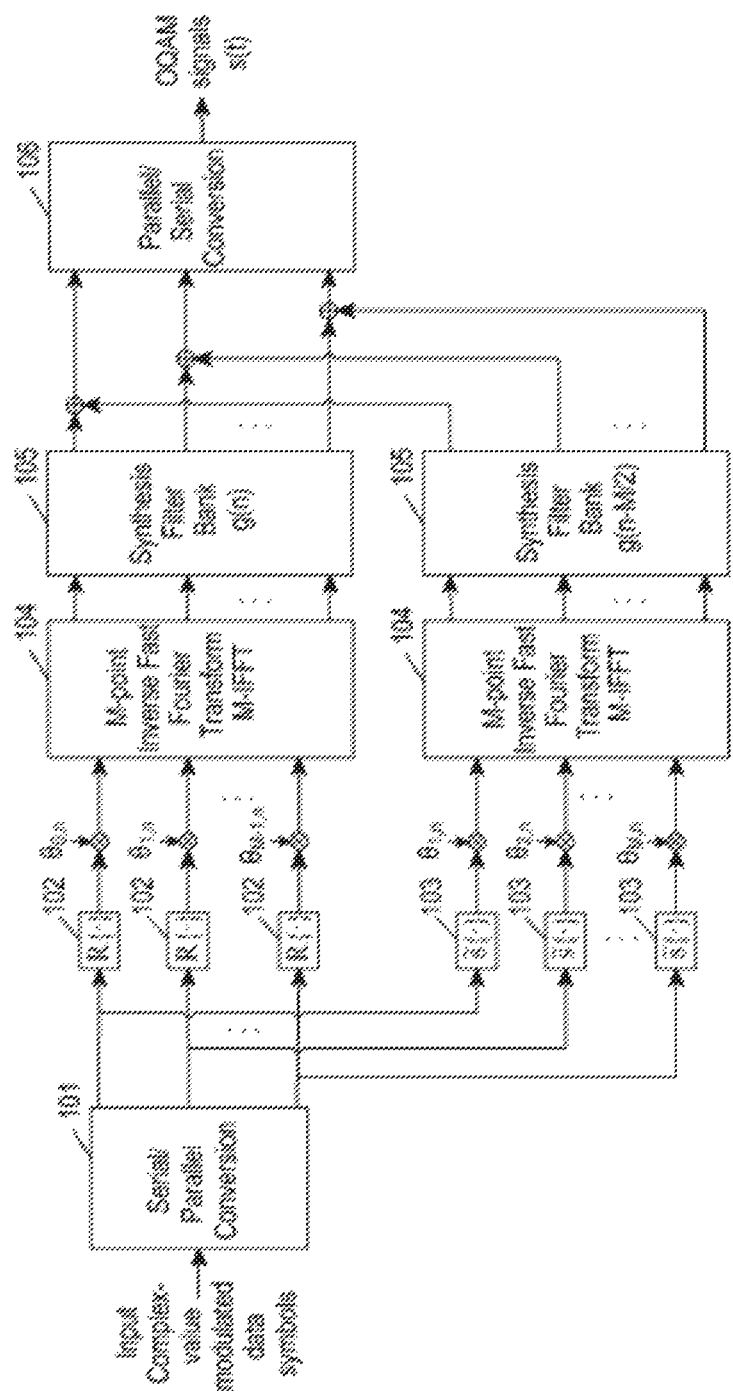
FIG. 1 is a block diagram of generating and transmitting conventional FBMC/OQAM signals according to the prior art.

FIG. 1 illustrates a block diagram of generating and transmitting conventional FBMC/OQAM signals according to the prior art.

As shown in FIG. 1, M parallel data streams are obtained after an input complex-value data stream containing, for example, complex-value QAM (Quadrature Amplitude Modulation) modulated symbols, is serial-to-parallel converted through a serial/parallel converter unit 101, where M is the number of sub-carriers. The transmitted signal is divided into two parts, with each containing either the real or imaginary part of the transmitted signal. The real and imaginary parts are respectively extracted through a real part extraction unit 102 and an imaginary part extraction unit 103. Then, the real part and the imaginary part of the transmitted signal are modulated respectively via an M-point Inverse Fast Fourier Transform (IFFT) unit 104. The modulated signals are then processed by Synthesis Filter Bank unit 105 to perform the pulse shaping. At last, the output signals from Synthesis Filter Bank unit 105 are combined, and the combined signals go through a parallel/serial converter unit 106 to output the OQAM signal.

The functions of each module or unit shown in figures can be easily understood from the mathematical expression of the OQAM signal. The continuous-time base-band signal model of an FBMC system can be expressed as $$s(t) = \sum_{n \in Z} \sum_{m=0}^{M-1} a_{m,n} \underbrace{j^{m+n} e^{j2\pi m v_0 t} g(t - n\tau_0)}_{g_{m,n}(t)} \tag{1}$$

where $(\bullet)_{m,n}$ represents a frequency-time point (m,n), $a_{m,n}$ represents a real-value symbol modulated on the m-th sub-carrier of the n-th symbol, that is, a pulse amplitude modulation (PAM) symbol, $a_{m,n}$ can be regarded as either the real or imaginary part of the complex-value QAM symbol $c_{m,\tilde{n}}$ with the symbol period of $\Sigma = 2\tau_0$, such as, $$a_{m,n} = \begin{cases} \Re\{c_{m,\tilde{n}}\}, & n \text{ is even number} \\ \Im\{c_{m,\tilde{n}}\}, & n \text{ is odd number} \end{cases};$$

$\Re$ and $\Im\{\bullet\}$ represent extracting real part and extracting imaginary part operations, respectively; j is an imaginary unit, $\theta_{m,n} = j^{m+n}$ represents the real-imaginary alternation; M is an even number representing the number of sub-carriers; Z is a set of the transmitted symbols; $v_0$ is the spacing between the sub-carriers; $\tau_0$ is the symbol period of the OQAM symbol, i.e., $\tau_0 = \tau/2 = 1/(2v_0)$; g is a prototype filter function, whose time-domain impulse response length is generally K times of $\tau$, which results in an overlapping of the time-domain waveforms of the adjacent (2K−1) symbols, and thus K is generally referred to as an overlapping factor of the filter. $g_{m,n}(t)$ is a synthesis filter function for modulating $a_{m,n}$. It can be seen that the symbol rate of the OQAM is two times of the symbol rate of the traditional OFDM without cyclic prefix (CP). Due to the fact that the OQAM modulation is performed on real numbers, the amount of information carried by each OQAM symbol is half of that of the traditional OFDM. That is to say, the effective data rate of an OQAM system is the same as that of an OFDM system without CP insertion.

The real field orthogonality of the OQAM is achieved by designing prototype filter function g. The inner product of the base function of synthesis filter bank at the transmitter and the base function of analysis filter bank at the receiver ought to satisfy or approximately satisfy equation (2), that is, the design of prototype filter banks needs to meet $$\Re\{\underbrace{\langle g_{m,n} | g_{m',n'}\rangle}_{\langle g\rangle_{m,n}^{m',n'}}\} = \Re\left(\int g_{m,n}(t) \cdot g^*_{m',n'}(t)dt\right) = \delta_{m,m'}\delta_{n,n'} \tag{2}$$

where * represents complex conjugate calculation, $\Re\{\bullet\}$ represents an operation of extracting real part of a given complex-value symbol, $\langle \bullet | \bullet \rangle$ represents inner product calculation, if m=m' and n=n', then $\delta_{m,m'}=1$, $\delta_{n,n'}=1$, otherwise the value is 0. That is to say, if m≠m' or n≠n', the inner product becomes a pure imaginary term. For simplicity, $\langle g \rangle_{m,n}^{m',n'}$ is used to represent the inner product operation. It is obvious that the interference generated by the signals between different sub-carriers and different symbols is a pure imaginary value. Accordingly, when the FBMC/OQAM signal s(t) is transmitted through a distortion-free channel, the perfect reconstruction (PR) of the originally transmitted real-value signal $a_{m,n}$ can be achieved by simply processing the received signal according to equation (3) via the receiving analysis filter (AF) $g^*_{m,n}(t)$ which is the matched filter with respect to the synthesis filter (SF) $g_{m,n}(t)$, where $\eta_0$ is a noise term, then the original complex-value QAM signal $c_{m,\tilde{n}}$ can be retrieved via combining.

$$\hat{a}_{m,n} = \Re\{y_{m,n}\} = \Re\{\langle (s(t)+n(t))|g_{m,n}\rangle\} = a_{m,n} + \eta_0,$$
$$m=0, \ldots, M-1, n \in Z \tag{3}$$

Figure 2:
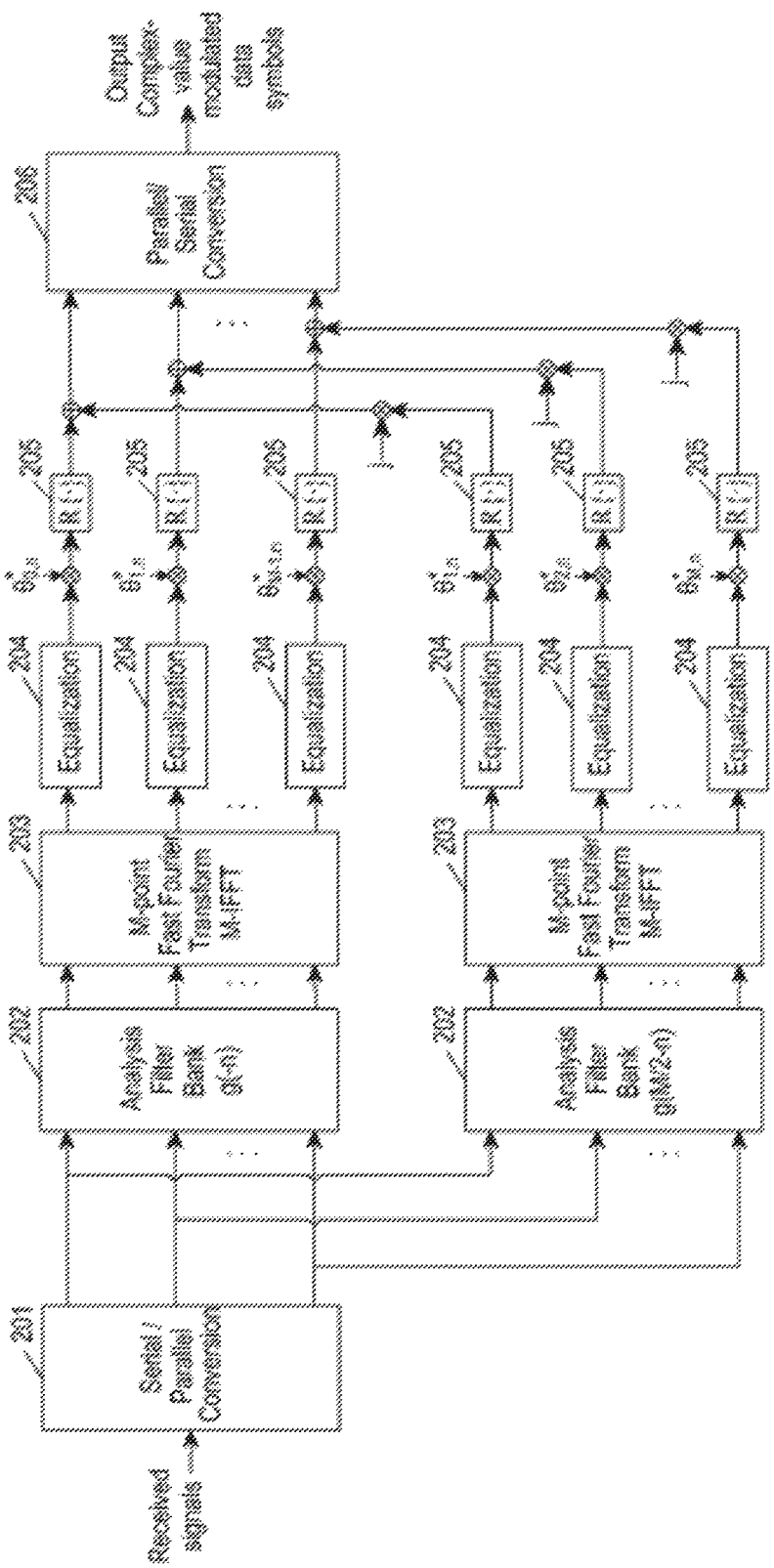
FIG. 2 is a block diagram of receiving and demodulating conventional FBMC/OQAM signals according to the prior art.

FIG. 2 illustrates a block diagram of receiving and demodulating conventional FBMC/OQAM signals according to the prior art.

As shown in FIG. 2, M parallel data streams are obtained after the received signal is serial-to-parallel converted through a serial/parallel converter unit 201. Each signal is respectively input into two analysis filter banks 202. The base function of the analysis filter bank 202 is a complex conjugate of that of said synthesis filter bank at the transmitter (105 of FIG. 1). Next, an output signal of each analysis filter bank 202 is processed by a corresponding M-point Fast Fourier Transform (FFT) unit 203 for demodulation. Demodulated data are equalized in equalizers 204. After that, the real part and the imaginary part of each sub-carrier are alternately extracted by real part extraction units 205. Finally, the real parts and imaginary parts are combined and a complex-value modulated data symbol, e.g., a complex-value QAM symbol, is output by a parallel/serial conversion unit 206. The function of each module or unit of FIG. 2 could be easily understood from the above OQAM demodulation formula in equation (3).

As mentioned above, in an FBMC/OQAM system, transmitted symbols are formed by superposition of a plurality of independent signals which are of equal bandwidth and modulated onto sub-carriers. When the signals on sub-carriers are in-phase, the superposition of them will generate a relatively large peak power, which will cause a large ratio of signal peak power to signal average power. The ratio herein is called Peak-to-Average Power Ratio (PAPR) in short. Although the length of the filter bank in an FBMC/OQAM system may be longer than the length of an FBMC/OQAM symbol, both the FBMC/OQAM system and the OFDM system transmit one frame of complex-value symbols during the period of $\tau$ in average, thus they have equivalent transmission rate. Therefore, the PAPR of the FBMC/OQAM system could also be defined as $$PAPR_{continues-time} = \frac{\max_{[0,\tau]}|s(t)|^2}{\frac{1}{\tau}\int_0^\tau |s(t)|^2 dt} \tag{4}$$

The PAPR performance of a signal is generally characterized by the Cumulative Density Function (CDF) of the PAPR. Besides, Complementary Cumulative Density Function (CCDF) is more commonly used in the literatures to characterize system's PAPR performance. The CCDF of the PAPR represents the probability of the power of the time-domain signal of a data block exceeding a certain threshold value. The distribution of the PAPR in an FBMC/OQAM system is evaluated in terms of its CCDF hereinafter.

Figure 3:
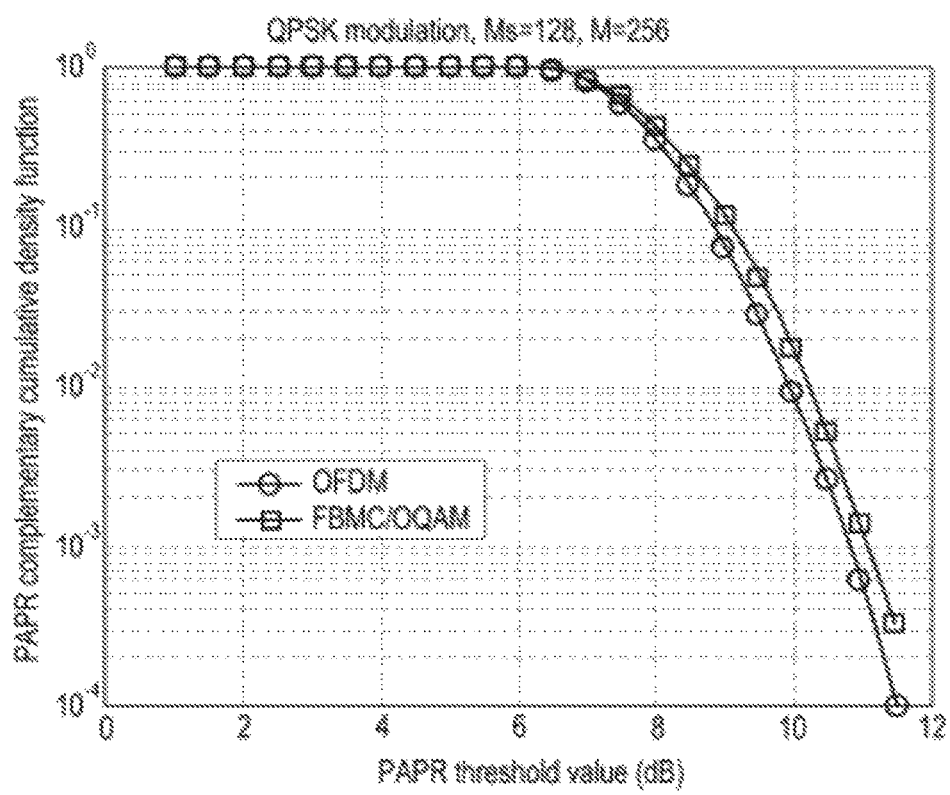
FIG. 3 illustrates simulation results of the complementary cumulative density function of the PAPR in a conventional OFDM and an FBMC/OQAM system according to the prior art.

FIG. 3 illustrates simulation results of the complementary cumulative density function of the PAPR in a conventional OFDM and an FBMC/OQAM system according to the prior art.

Referring to FIG. 3, in the simulation, the total number of sub-carriers of both the OFDM system and the FBMC/OQAM system, M, are 256, the number of occupied sub-carriers, Ms, is 128, and QPSK modulation is employed by both schemes. The number of input data blocks of the OFDM system and the FBMC/OQAM system are both 100, regardless of the influence of cyclic prefix in the OFDM system. It can be seen from the simulation results in FIG. 3 that, as the FBMC/OQAM system also belongs to a category of a multi-carrier system, the PAPR performance of the FBMC/OQAM system is similar to that of the OFDM system. However, as the length of the prototype filter of the FBMC/OQAM system is longer than the length of one FBMC/OQAM symbol, the PAPR performance of the FBMC/OQAM system is slightly worse than that of the OFDM system.

Some solutions to improve the PAPR performance are provided by the prior art, and one of them is based on DFT spreading.

Figure 4:
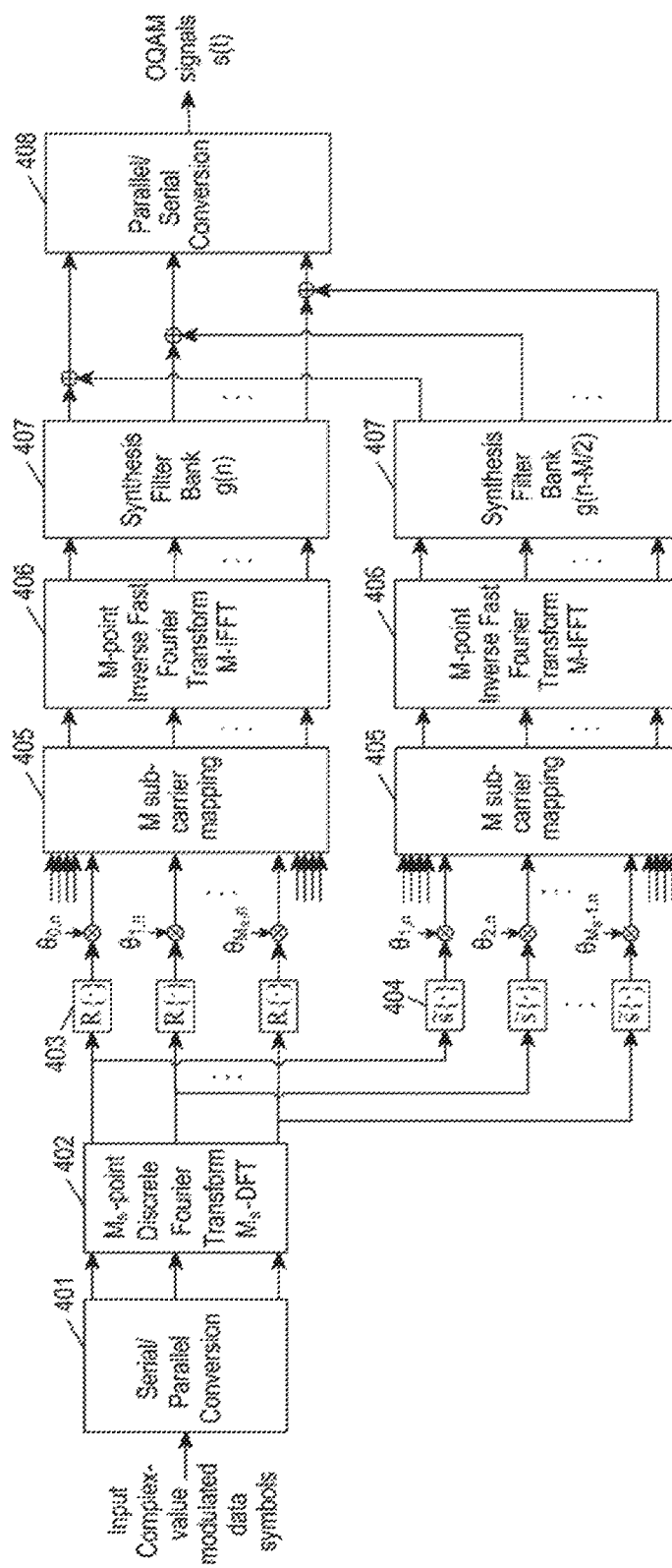
FIG. 4 is a block diagram of generating and transmitting simple DFT spread FBMC/OQAM (DFT-s-FBMC/OQAM) signals according to the prior art.

FIG. 4 illustrates the design principle of the transmitter of an FBMC/OQAM system based on a simple DFT spreading according to the prior art.

As shown in FIG. 4, a DFT spreading operation is applied on a complex-value modulated data stream in an Ms-point Discrete Fourier Transform (DFT) unit 402 after being converted in a serial/parallel converter unit 401. Said complex-value modulated data may be an MPSK (M-ary Phase Shift Keying) modulated signal or an MQAM (M-ary Quadrature Amplitude Modulation) modulated signal. Particularly, the complex-value modulated data could be represented in a vector form as $s=[s_0, s_1, \ldots, s_{M_s-1}]^T$, where $[\bullet]^T$ represents transposition operation of a vector, and the complex-value modulated data comprises $M_s$ complex-value modulated symbols $s_i$ ($i=0, 1, \ldots M_s-1$). Then, the complex-value modulated data $\bar{s}$ is processed by an $M_s$-point DFT spreading ($F_{M_s}$), resulting $$\bar{x} = \begin{bmatrix} x_0 \\ x_1 \\ \vdots \\ x_{M_s-1} \end{bmatrix} = \frac{1}{\sqrt{M_s}} \underbrace{\begin{bmatrix} 1 & 1 & \cdots & 1 \\ 1 & W_{M_s} & \cdots & W_{M_s}^{M_s-1} \\ \vdots & \vdots & \ddots & \vdots \\ 1 & W_{M_s}^{M_s-1} & \cdots & W_{M_s}^{(M_s-1)^2} \end{bmatrix}}_{F_{M_s}} \begin{bmatrix} s_0 \\ s_1 \\ \vdots \\ s_{M_s-1} \end{bmatrix} \quad (5)$$

where $1/\sqrt{M_s}$ represents a power normalization factor of the DFT spreading, and $W_{M_s}=e^{-j2\pi/M_s}$.

The data symbol vector $\bar{x}$ after the DFT spreading is transmitted after an OQAM modulation (equation (1)). Specifically, $\bar{x}$ is firstly divided into two signals, which are alternately modulated onto the real part and imaginary part of a sub-carrier and are transmitted with a time offset. More particularly, the real parts and imaginary parts of the two signals are respectively extracted by a real-part extraction unit 403 and an imaginary-part extraction unit 404. If it is assumed that the time indexes of the two signals are 2n and 2n+1, respectively, then $$\bar{a}_{2n} = \begin{bmatrix} \Re\{x_0\} \\ j \cdot \Re\{x_1\} \\ \Re\{x_2\} \\ j \cdot \Re\{x_3\} \\ \vdots \\ j \cdot \Re\{x_{M_s-1}\} \end{bmatrix}, \bar{a}_{2n+1} = \begin{bmatrix} j \cdot \Im\{x_0\} \\ \Im\{x_1\} \\ j \cdot \Im\{x_2\} \\ \Im\{x_3\} \\ \vdots \\ \Im\{x_{M_s-1}\} \end{bmatrix} \quad (6)$$

Signals $\bar{a}_{2n}$ and $\bar{a}_{2n+1}$ are then mapped onto $M_s$ continuous or discontinuous sub-carriers by a sub-carrier mapping unit 405. If it is assumed that the mapped sub-carriers are continuous and the initial index of the mapped sub-carriers is 0, then $$\bar{b}_{m,2n} = \begin{cases} \bar{a}_{m,2n}, & m = 0, 1, \ldots, M_s - 1 \\ 0, & m = M_s, M_s + 1, \ldots, M - 1 \end{cases}, \quad (7)$$

$$\bar{b}_{m,2n+1} = \begin{cases} \bar{a}_{m,2n+1}, & m = 0, 1, \ldots, M_s - 1 \\ 0, & m = M_s, M_s + 1, \ldots, M - 1 \end{cases}$$

where M represents the total number of sub-carriers. Afterwards, data symbols $\bar{b}_{m,2n}$ and $\bar{b}_{m,2n+1}$ and k are respectively processed by an M-point IFFT transformation (through an Inverse Fast Fourier Transform unit 406) and Polyphase filter bank operations (through a Synthesis Filter Bank unit 407), and then output an OQAM signal through a parallel/serial conversion unit 408. Said OQAM signal is then transmitted.

Figure 5:
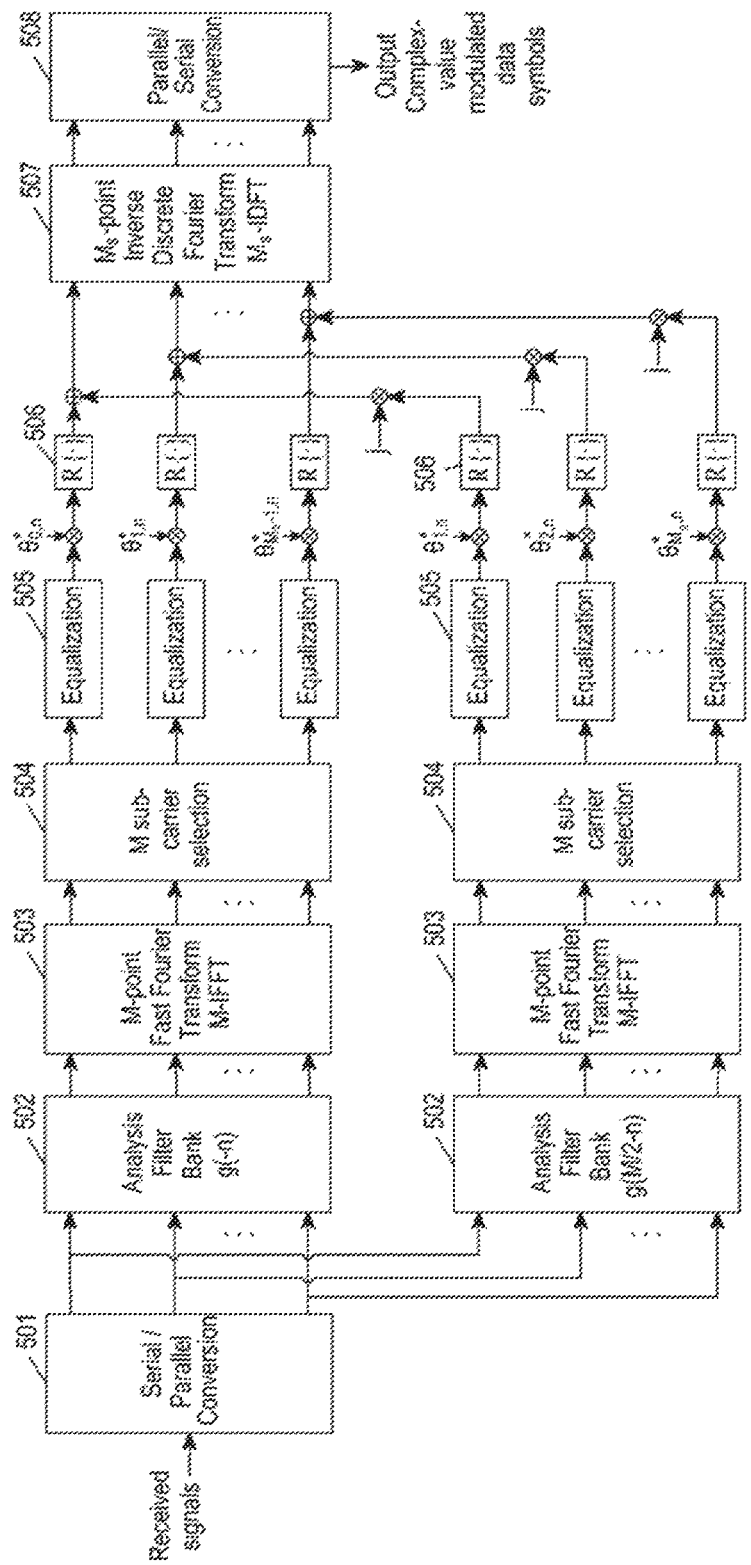
FIG. 5 is a block diagram of receiving and demodulating simple DFT spread FBMC/OQAM (DFT-s-FBMC/OQAM) signals according to the prior art.

FIG. 5 illustrates the design principle of the receiver of an FBMC/OQAM system based on a simple DFT spreading according to the prior art.

As shown in FIG. 5, the operations performed through blocks 501 to 508 at the receiver are substantially inverse operations of those at the transmitter as described in FIG. 4. Accordingly, a detailed description of the operations at the receiver in FIG. 5 will be omitted. At the receiver, in addition to performing OQAM demodulation, sub-carriers selection and channel equalization on the received symbols, $M_s$-point IDFT inverse spreading operation to the demodulated OQAM signals relative to the $M_s$-point DFT spreading at the transmitter is also needed.

Figure 6:
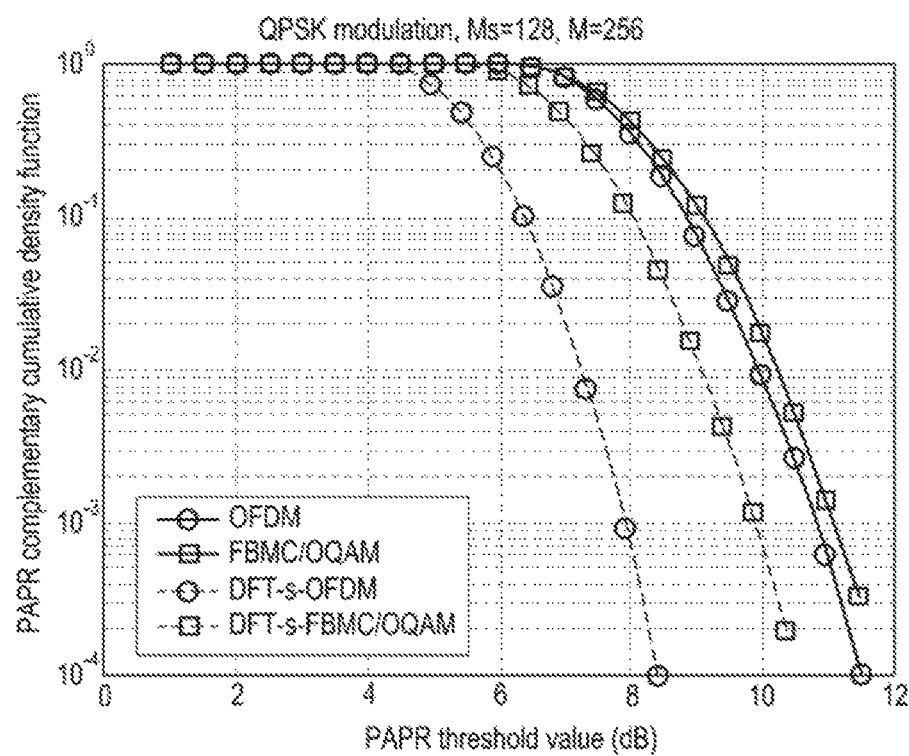
FIG. 6 illustrates simulation results of the complementary cumulative density function of the PAPR in an OFDM system and an FBMC/OQAM system which are based on simple DFT spreading according to the prior art.

FIG. 6 illustrates simulation results of the complementary cumulative density function of the PAPR of a DFT spread OFDM (DFT-s-OFDM) system and a DFT spread FBMC/OQAM (DFT-s-FBMC/OQAM) system according to the prior art. As can be seen from the simulation results in FIG. 6, although the DFT-s-FBMC/OQAM system improves the PAPR performance of an FBMC/OQAM system to some extent, it is still far from the DFT-s-OFDM system used in LTE uplink in terms of PAPR performance improvement.

To address the above problem, a novel effective FBMC/OQAM system based on DFT spreading is provided by the present application. The solutions provided by the present application make the PAPR performance of an FBMC/OQAM system comparable to that of a single carrier system while maintaining the inherent characteristics of the FBMC/OQAM system. Technical solutions of the present application are further discussed in detail by the following preferable embodiments.

First Embodiment

In the first embodiment, the PAPR of an FBMC/OQAM system is reduced by using an FBMC/OQAM signal generation method based on Conjugate Symmetric (CS) DFT spreading. It can be concluded from the precedent simulation results that, the improvement, based on a simple DFT-s-FBMC/OQAM, of the system PAPR performance is limited. This is mainly because that, in DFT-s-FBMC/OQAM, the input complex-value modulated data is divided into two signal branches after being processed by DFT spreading such that the two signal branches are respectively the real parts and imaginary parts of the data symbols output from the DFT spreading, and they are alternately modulated onto the real parts and imaginary parts of mapped sub-carriers and then transmitted with certain time offset. This kind of nonlinear operation not only fails to achieve a causality symmetry effect between DFT spreading and IFFT operation, but also results in relatively high peak power of the time-domain signals with a relatively high probability.

FIG. 7 is a block diagram illustrating an example of a configuration of a transmitter in a Conjugate Symmetric DFT spread FBMC/OQAM (CS-DFT-s-FBMC/OQAM) system according to a first embodiment of the present application. Those skilled in the art will appreciate that, for the purpose of illustration and understanding, one or more specific technical features are illustrated and described in the following description. However, the embodiments of the present application could also be implemented without these features.

As shown in FIG. 7, the complex-value modulated data is input to a Conjugate Symmetric (CS) operation unit 702 after being converted by a serial/parallel converter unit, 701 and then input to an M-point Discrete Fourier Transform (DFT) unit 703. After a Conjugate Symmetric DFT spreading, two generated signals are alternately modulated onto the real part and the imaginary part of a sub-carrier through a sub-carrier mapping unit 704, an M-point Inverse Fast Fourier Transform (IFFT) unit 705 and a Synthesis Filter Bank unit 706, and then an OQAM symbol is output by the serial/parallel conversion unit 707. Further, the transmission signal is transmitted with certain time offset as described above.

Different from the simple DFT spreading method, the data symbols after Conjugate Symmetric DFT spreading are all pure real values, and could be directly modulated onto the corresponding time-frequency resources and transmitted without the nonlinear operation of extracting the real part and the imaginary part of a given complex-value symbol.

In some embodiments, the Conjugate Symmetric DFT spreading method comprises two steps, a Conjugate Symmetric (CS) operation and a DFT spreading operation.

FIG. 8 illustrates an exemplary flow chart of the design principle of applying a CS operation to given data symbols according to the embodiment of the present application.

As shown in FIG. 8, the input complex-value modulated data is divided into two signals by a data separation module 801 first. Specifically, the input $M_r$ complex-value modulated data symbols may be represented in a vector form as $\bar{d} = [d_0, d_1, \ldots, d_{M_r-1}]^T$. Said data separation module 801 divides input complex-value modulated data into two complex-value modulated data with equal length, which are represented by $\bar{d}_I$ and $\bar{d}_Q$, respectively. For example, $\bar{d}_I$ and $\bar{d}_Q$ may be extracted from the first half and the second half of $\bar{d}$, respectively, and may be represented by $$\bar{d}_I = [d_0, d_1, \ldots, d_{M_r/2-1}]^T, \bar{d}_Q = [d_{M_r/2}, d_{M_r/2+1}, \ldots, d_{M_r-1}]^T \quad (8)$$

It should be noted that, the specific method for data separation is not limited in the present application, as long as the input complex-value modulated data is divided into two complex-value modulated data with equal length and the receiver is aware of the data separation method used by the transmitter for data demodulation.

After the data separation, each of the two complex-value modulated data is input into a data replication module 802, respectively. Said data replication module 802 applies a data replication and a power allocation to the input data and outputs two complex-value modulated data after the power allocation, which are represented by $$\bar{s}_I = [s_I[0], s_I[1], \ldots, s_I[M_r/2-1]]^T = \alpha_I \bar{d}_I,$$

$$\bar{s}_Q = [s_Q[0], s_Q[1], \ldots, s_Q[M_r/2-1]]^T = \alpha_Q \bar{d}_Q. \quad (9)$$

where $\alpha_I$ and $\alpha_Q$ are power allocation factors corresponding to two complex-value modulated data streams, respectively. It should be noted that, the present application should not be limited to the specific method for power allocation as long as the total system transmit power meets the demand of the system design and receiver is aware of the power allocation method used by the transmitter for data demodulation. One of the two complex-value modulated data after the data replication operation is input into a data conjugate calculation module 803, and the other one is input into a data symmetric calculation module 804. Specifically, the data conjugate calculation module 803 applies a conjugate calculation to the input data, the output may be respectively represented by $$\bar{s}_I^C = [s_I^*[0], s_I^*[1], \ldots, s_I^*[M_r/2-1]]^T,$$
$$\bar{s}_Q^C = [s_Q^*[0], s_Q^*[1], \ldots, s_Q^*[M_r/2-1]]^T \quad (10)$$

The output data from the data conjugate calculation module 803 is also input to the data symmetric calculation module 804. Said data symmetric calculation module 804 rotates one of the two input complex-value modulated data and combines the rotated one with the other one. In some embodiments, the data symmetric calculation module 804 firstly applies rotation operation to the input data from the data conjugate calculation module 803. This rotation operation can be denoted as $\bar{s}_I^S = f_{usd}(\bar{s}_I^C)$ and $s_Q^S = f_{usd}(s_Q^C)$, and can be mathematically expressed as $$\bar{s}_I^S = f_{usd}(\bar{s}_I^C) = [s_I^*[M_r/2-1], s_I^*[M_r/2-2], \ldots, s_I^*[0]]^T,$$

$$\bar{s}_Q^S = f_{usd}(\bar{s}_Q^C) = [s_Q^*[M_r/2-1], s_Q^*[M_r/2-2], \ldots, s_Q^*[0]]^T. \quad (11)$$

Afterwards, the data symmetric calculation module 804 applies combination and zero padding operations to the input data from the data replication module 802 and input data from the data conjugate calculation module 803 which has been rotated, and outputs a conjugate symmetric complex-value modulated data. Specifically, in one implementation, the conjugate symmetric complex-value modulated data could be represented by $$\bar{s}_I^{CS} = f_{cs}(\bar{s}_I, \bar{s}_I^S) = \left[[\bar{s}_I]^T, 0, [\bar{s}_I^S]^T\right]^T \quad (12)$$
$$= [s_I[0], s_I[1], \ldots, s_I[M_r/2-1], 0,$$
$$s_I^*[M_r/2-1], s_I^*[M_r/2-2], \ldots, s_I^*[0]]^T,$$

$$\bar{s}_Q^{CS} = f_{cs}(\bar{s}_Q, \bar{s}_Q^S) = \left[[\bar{s}_Q]^T, 0, [\bar{s}_Q^S]^T\right]^T$$
$$= [s_Q[0], s_Q[1], \ldots, s_Q[M_r/2-1], 0,$$
$$s_Q^*[M_r/2-1], s_Q^*[M_r/2-2], \ldots, s_Q^*[0]]^T$$

Specially, equation (12) represents that zero padding operation is applied at the Direct Current (DC) component of a given input data. In another implementation, the conjugate symmetric complex-value modulated data may also be represented by $$\bar{s}_I^{CS} = f_{cs}(\bar{s}_I, \bar{s}_I^S) = [0, [\bar{s}_I]^T, 0, [\bar{s}_I^S]^T]^T \quad (13)$$
$$= [0, s_I[0], s_I[1], \ldots, s_I[M_r/2 - 1],$$
$$0, s_I^*[M_r/2 - 1], s_I^*[M_r/2 - 2], \ldots, s_I^*[0]]^T,$$

$$\bar{s}_Q^{CS} = f_{cs}(\bar{s}_Q, \bar{s}_Q^S) = [0, [\bar{s}_Q]^T, 0, [\bar{s}_Q^S]^T]^T$$
$$= [0, s_Q[0], s_Q[1], \ldots, s_Q[M_r/2 - 1],$$
$$0, s_Q^*[M_r/2 - 1], s_Q^*[M_r/2 - 2], \ldots, s_Q^*[0]]^T,$$

Equation (13) represents that the zero padding operation is simultaneously applied at the front of each of the two input data flows to be combined.

Afterwards, the output two data streams from the data symmetric calculation module 804 are processed by DFT spreading operations (referring to 703 of FIG. 7), respectively. Take the two complex-value modulated data streams ($\bar{s}_I^{CS}$ and $\bar{s}_Q^{CS}$) that have been processed by Conjugate Symmetric (CS) operations for example, after being processed by $M_s$-point ($M_s = M_r + 2$) DFT spreading ($F_{M_s}$), the resulted data symbols can be respectively expressed as $$\bar{x}_I = \begin{bmatrix} \bar{x}_0^I \\ \bar{x}_1^I \\ \vdots \\ \bar{x}_{M_s-1}^I \end{bmatrix} = F_{M_s} \bar{s}_I^{CS}, \bar{x}_Q = \begin{bmatrix} \bar{x}_0^Q \\ \bar{x}_1^Q \\ \vdots \\ \bar{x}_{M_s-1}^Q \end{bmatrix} = F_{M_s} \bar{s}_Q^{CS}. \quad (14)$$

where $F_{M_s}$ is a DFT matrix with size of $M_s \times M_s$ with power normalization, the specific expression of which may be found by referring to equation (5). It should be noted that, after processing the conjugate symmetric complex-value modulated data) (i.e. $\bar{s}_I^{CS}$ and $\bar{s}_Q^{CS}$) with DFT spreading, the corresponding resulted data symbols (i.e., $\bar{x}_I$ and $\bar{x}_Q$) are all pure real values. $\bar{x}_I$ and $\bar{x}_Q$ are then alternately modulated onto the real parts and the imaginary parts of corresponding sub-carriers and transmitted with certain time offset. If it is assumed that the time indexes of the two signals are 2n and 2n+1, respectively, then $$\bar{y}_{2n}^I = \begin{bmatrix} \bar{x}_0^I \\ j \cdot \bar{x}_1^I \\ \bar{x}_2^I \\ j \cdot \bar{x}_3^I \\ \vdots \\ j \cdot \bar{x}_{M_s-1}^I \end{bmatrix}, \bar{y}_{2n+1}^Q = \begin{bmatrix} j \cdot \bar{x}_0^Q \\ \bar{x}_1^Q \\ j \\ \vdots \\ \bar{x}_{M_s-1}^Q \end{bmatrix}. \quad (15)$$

Afterwards, signals $\bar{y}_{2n}^I$ and $\bar{y}_{2n+1}^Q$ are mapped onto $M_s$ continuous or discontinuous sub-carriers through a sub-carrier mapping unit (referring to reference numeral "704" of FIG. 7). If it is assumed that the resource mappings are continuous and the initial index of the mapped sub-carriers is 0, then $$z_{m,2n}^I = \begin{cases} \bar{y}_{m,2n}^I, & m = 0, 1, \ldots, M_s - 1 \\ 0, & m = M_s, M_s + 1, \ldots, M - 1 \end{cases}, \quad (16)$$

$$z_{m,2n+1}^Q = \begin{cases} \bar{y}_{m,2n+1}^Q, & m = 0, 1, \ldots, M_s - 1 \\ 0, & m = M_s, M_s + 1, \ldots, M - 1 \end{cases}$$

where M represents the total number of sub-carriers. Afterwards, data symbols $\{\bar{z}_{m,2n}\}$ and $\{\bar{z}_{m,2n+1}^Q\}$ are transmitted after being processed by M-point IFFT (referring to reference numeral "705" of FIG. 7) and Polyphase filter bank operations (referring to reference numeral "706" of FIG. 7).

FIG. 9 is a block diagram illustrating an example of a configuration of a receiver in a CS-DFT-s-FBMC/OQAM system according to the first embodiment of the present application.

As shown in FIG. 9, the operations of blocks 901 to 910 at the receiver may be understood to be substantially inverse operations of those at the transmitter as described in FIG. 7. At the receiver of FIG. 9, in addition to performing OQAM demodulation (Analysis Filter Bank unit 902 and M-point Fast Fourier Transform (FFT) unit 903), sub-carriers selection (Sub-Carrier Selection unit 904) and channel equalization 905) on the received symbols, CS-IDFT inverse spreading operations to the demodulated OQAM signals corresponding to the CS-DFT spreading at the transmitter are also needed.

In some embodiments, the CS-IDFT inverse spreading operation comprises two parts, an IDFT inverse spreading operation and an inverse Conjugate Symmetric (CS) operation. If the received signals after sub-carrier selections (904) and channel equalizations (905) can be written as $\tilde{y}_I = [\tilde{y}_0^I, \tilde{y}_1^I, \ldots, \tilde{y}_{M_s-1}^I]^T$ and $\tilde{y}_Q = [\tilde{y}_0^Q, \tilde{y}_1^Q, \ldots, \tilde{y}_{M_s-1}^Q]^T$, respectively, then after performing per sub-carrier phase rotation operation by phase rotation unit 906 on $\tilde{y}_I$ and $\tilde{y}_Q$, the resulted $\tilde{x}_I$ and $\tilde{x}_Q$ can be represented by $$\tilde{x}_I = \begin{bmatrix} \tilde{y}_0^I \\ (-j) \cdot \tilde{y}_1^I \\ \tilde{y}_2^I \\ (-j) \cdot \tilde{y}_3^I \\ \vdots \\ (-j) \cdot \tilde{y}_{M_s-1}^I \end{bmatrix}, \tilde{x}_Q = \begin{bmatrix} (-j) \cdot \tilde{y}_0^Q \\ \tilde{y}_1^Q \\ (-j) \cdot \tilde{y}_2^Q \\ \tilde{y}_3^Q \\ \vdots \\ \tilde{y}_{M_s-1}^Q \end{bmatrix}. \quad (17)$$

Afterwards, the real parts of the two data symbols $\tilde{x}_I$ and $\tilde{x}_Q$ are extracted by a real-part extraction unit 907 and perform $M_s$-point IDFT inverse spreading operations (908) on the extracted real parts, the resulted output symbols can be expressed as $$\tilde{s}_I^{CS} = \begin{bmatrix} \tilde{s}_I^{CS}[0] \\ \tilde{s}_I^{CS}[1] \\ \vdots \\ \tilde{s}_I^{CS}[M_s - 1] \end{bmatrix} = F_{M_s}^{-1} R\{\tilde{x}_I\}, \quad (18)$$

$$\tilde{s}_Q^{CS} = \begin{bmatrix} \tilde{s}_Q^{CS}[0] \\ \tilde{s}_Q^{CS}[1] \\ \vdots \\ \tilde{s}_Q^{CS}[M_s - 1] \end{bmatrix} = F_{M_s}^{-1} R\{\tilde{x}_Q\}$$

where $(\cdot)^{-1}$ is a matrix inversion operation, and $F_{M_s}$ is a DFT matrix with size of $M_s \times M_s$. An inverse Conjugate Symmetric (CS) operation (909) is applied to $\tilde{s}_I^{CS}$ and $\tilde{s}_Q^{CS}$.

FIG. 10 illustrates a flow chart of applying an inverse CS operation to given data symbols according to the embodiment of the present application.

As shown in FIG. 10, $\tilde{s}_I^{CS}$ and $\tilde{s}_Q^{CS}$ are respectively input to a data separation module 1001 first, and the data separation module 1001 outputs two data streams with equal length. Specifically, if the data separation module (e.g., reference numeral "801" in FIG. 8) and the data symmetric calculation module (reference numeral "804" in FIG. 8) are employed at the transmitter to perform operations and calculations according to equations (8) and (13), assuming that the input data is $\tilde{s}_I^{CS}$, the corresponding data separation module 1001 at the receiver outputs two complex-value data streams with equal length, which are respectively represented by $\tilde{s}_{I_a}^S$ and $\tilde{s}_{I_b}^{CS}$. Specifically, $$\tilde{s}_{I_a}^S = [\tilde{s}_{I_a}^S[0], \tilde{s}_{I_a}^S[1], \ldots, \tilde{s}_{I_a}^S[M_r/2-1]]^T \quad (19)$$
$$= [\tilde{s}_I^{CS}[1], \tilde{s}_I^{CS}[2], \ldots, \tilde{s}_I^{CS}[M_s/2-1]]^T,$$

$$\tilde{s}_{I_b}^{CS} = [\tilde{s}_{I_b}^{CS}[0], \tilde{s}_{I_b}^{CS}[1], \ldots, \tilde{s}_{I_b}^{CS}[M_r/2-1]]^T$$
$$= [\tilde{s}_I^{CS}[M_s/2+1], \tilde{s}_I^{CS}[M_s/2+2], \ldots, \tilde{s}_I^{CS}[M_s-1]]^T.$$

Similarly, the outputs, which correspond to the input $\tilde{s}_Q^{CS}$, of the data separation module 1001 at the receiver are, respectively:

$$\tilde{s}_{Q_a}^S = [\tilde{s}_{Q_a}^S[0], \tilde{s}_{Q_a}^S[1], \ldots, \tilde{s}_{Q_a}^S[M_r/2-1]]^T \quad (20)$$
$$= [\tilde{s}_Q^{CS}[1], \tilde{s}_Q^{CS}[2], \ldots, \tilde{s}_Q^{CS}[M_r/2-1]]^T,$$

$$\tilde{s}_{Q_b}^{CS} = [\tilde{s}_{Q_b}^{CS}[0], \tilde{s}_{Q_b}^{CS}[1], \ldots, \tilde{s}_{Q_b}^{CS}[M_r/2-1]]^T$$
$$= [\tilde{s}_Q^{CS}[M_s/2+1], \tilde{s}_Q^{CS}[M_s/2+2], \ldots, \tilde{s}_Q^{CS}[M_s-1]]^T.$$

Afterwards, $\tilde{s}_{I_a}^S$ and $\tilde{s}_{Q_a}^S$ are input to a data replication module 1003 and then output to a data symmetric merging module 1004. The data replication module 1003 does not apply any calculations and/or operations to the input data. $\tilde{s}_{I_b}^{CS}$ and $\tilde{s}_{Q_b}^{CS}$ are input to a data conjugate calculation module 1002. Specifically, the conjugate calculations are applied to the input data by the data conjugate calculation module 1002, and the results may be represented by $$\tilde{s}_{I_b}^S = [\tilde{s}_{I_b}^S[0], \tilde{s}_{I_b}^S[1], \ldots, \tilde{s}_{I_b}^S[M_r/2-1]]^T \quad (21)$$
$$= (\tilde{s}_{I_b}^{CS})^* = [(\tilde{s}_{I_b}^{CS})^*[0], (\tilde{s}_{I_b}^{CS})^*[1], \ldots, (\tilde{s}_{I_b}^{CS})^*[M_r/2-1]],$$

$$\tilde{s}_{Q_b}^S = [\tilde{s}_{Q_b}^S[0], \tilde{s}_{Q_b}^S[1], \ldots, \tilde{s}_{Q_b}^S[M_r/2-1]]^T$$
$$= (\tilde{s}_{Q_b}^{CS})^* = [(\tilde{s}_{Q_b}^{CS})^*[0], (\tilde{s}_{Q_b}^{CS})^*[1], \ldots, (\tilde{s}_{Q_b}^{CS})^*[M_r/2-1]].$$

Afterwards, $\tilde{s}_{I_b}^S$ and $\tilde{s}_{Q_b}^S$ are input to corresponding data symmetric merging modules 1004, respectively. Specifically, the data symmetric merging modules 1004 apply rotation operations to the input data from the data conjugate calculation module 1002 first, wherein the rotation operations are denoted by $f_{usd}(\tilde{s}_{I_b}^S)$ and $f_{usd}(\tilde{s}_{Q_b}^S)$, respectively, and the specific calculating operations are the same as those given in equation (11). Said data symmetric merging modules 1004 then apply merging operations to the input data from data replication modules 1003 and the rotated input data from the data conjugate calculation modules 1002, wherein the merging operations are represented by $$\tilde{s}_I = \frac{1}{\alpha_I}[\tilde{s}_{I_a}^S + f_{usd}(\tilde{s}_{I_b}^S)] \quad (22)$$
$$\frac{1}{\alpha_I} \cdot [\tilde{s}_{I_a}^S[0] + \tilde{s}_{I_b}^S[M_r/2-1], \tilde{s}_{I_a}^S[1] + \tilde{s}_{I_b}^S[M_r/2-2],$$
$$\ldots, \tilde{s}_{I_a}^S[M_r/2-1] + \tilde{s}_{I_b}^S[0]]^T,$$

$$\tilde{s}_Q = \frac{1}{\alpha_Q}[\tilde{s}_{Q_a}^S + f_{usd}(\tilde{s}_{Q_b}^S)]$$
$$\frac{1}{\alpha_Q} \cdot [\tilde{s}_{Q_a}^S[0] + \tilde{s}_{Q_b}^S[M_r/2-1], \tilde{s}_{Q_a}^S[1] + \tilde{s}_{Q_b}^S[M_r/2-2],$$
$$\ldots, \tilde{s}_{Q_a}^S[M_r/2-1] + \tilde{s}_{Q_b}^S[0]]^T.$$

where $\alpha_I$ and $\alpha_Q$ are corresponding power allocation factors employed at the transmitter. Finally, $\tilde{s}_I$ and $\tilde{s}_Q$ are input to a data merging module 1005 for merging, and a complex-value modulated data $\tilde{s}$ is thus output, which may be represented by:

$$\tilde{s} = [[\tilde{s}_I]^T, [\tilde{s}_Q]^T]^T \quad (23)$$
$$= [\tilde{s}_I[0], \tilde{s}_I[1], \ldots, \tilde{s}_I[M_r/2-1], \tilde{s}_Q[0],$$
$$\tilde{s}_Q[1], \ldots, \tilde{s}_Q[M_r/2-1]]^T.$$

FIG. 11 illustrates the simulation results of the complementary cumulative density function of the PAPR of a CS-DFT-s-FBMC/OQAM system according to the first embodiment of the present application.

As can be seen from the simulation results shown in FIG. 11, the CS-DFT-s-FBMC/OQAM system substantially improves the PAPR performance of a FBMC/OQAM system, and significantly outperforms the DFT-s-FBMC/OQAM scheme in terms of the PAPR performance. Besides, compared with the DFT-s-OFDM used in LTE uplink, the CS-DFT-s-FBMC/OQAM provides comparable PAPR performance.

Second Embodiment

Compared with the first embodiment of the present application, in the second embodiment of the present application, one of the two data streams output from the Conjugate Symmetric (CS) operation is first phase rotated and then DFT spread while the other output data stream is directly processed by DFT spreading.

FIG. 12 is a block diagram illustrating an example of a configuration of a transmitter in a CS-DFT-s-FBMC/OQAM system according to a second embodiment of the present application.

As shown in FIG. 12, the complex-value modulated data is converted by a serial/parallel conversion unit (1201), and then after a conjugate symmetric DFT spreading (CS operation unit 1202 and Discrete Fourier Transform unit 1203) and a sub-carrier allocation operation (sub-carrier allocation unit 1204), the resulted signals are directly modulated onto the mapped sub-carriers. The method for OQAM modulation is the same as that in the first embodiment. Reference can be made to FIG. 7 for detail and this method will be omitted hereinafter.

Specifically, in the second embodiment of the present application, the conjugate symmetric DFT spreading method mainly comprises two steps, a Conjugate Symmetric (CS) operation (CS operation unit 1202) and a DFT spreading operation (Discrete Fourier Transform unit 1204). Herein, the conjugate symmetric operation and the DFT spreading operation exhibit exactly the same functionalities as those in the conjugate symmetric operation and the DFT spreading operation described in the first embodiment of the present application. The difference lies in that, in the second embodiment of the present application, one of the two data streams output from the conjugate symmetric operation is first phase rotated in a phase rotation unit 1203 and then processed by the DFT spreading, while the other output data is processed by the DFT spreading operation directly. In some implementations, the phase rotation operation specifically refers to multiplying each data symbol in the data stream by an imaginary unit j. The two data streams output from DFT spreading operations are processed by sub-carrier allocation operation (sub-carrier allocation unit 1205), and then directly modulated onto corresponding time-frequency resources and transmitted.

FIG. 13 is a diagram for explaining an example of applying a sub-carrier allocation operation to given data symbols according to the second embodiment of the present application.

As shown in FIG. 13, it is assumed that the two data streams after the conjugate symmetric operation may be represented by $\bar{s}_I^{CS}$ and $\bar{s}_Q^{CS}$, respectively. The phase of each symbol in $\bar{s}_Q^{CS}$ is rotated, which gives $j \cdot \bar{s}_Q^{CS} = [j \cdot \bar{s}_Q^{CS}[0], j \cdot \bar{s}_Q^{CS}[1], \ldots, j \cdot \bar{s}_Q^{CS}[M_s-1]]^T$. Afterwards, $\bar{s}_I^{CS}$ and $j \cdot \bar{s}_Q^{CS}$ are processed by $M_s$-point DFT operations (Discrete Fourier Transform unit 1204), respectively, which yield $\bar{x}_I$ and $\bar{x}_Q$ and are given by $$\bar{x}_I = \begin{bmatrix} \bar{x}_0^I \\ \bar{x}_1^I \\ \vdots \\ \bar{x}_{M_s-1}^I \end{bmatrix} = \quad (24)$$

$$F_{M_s} \bar{s}_I^{CS} = \frac{1}{\sqrt{M_s}} \begin{bmatrix} 1 & 1 & \cdots & 1 \\ 1 & W_{M_s} & \cdots & W_{M_s}^{M_s-1} \\ \vdots & \vdots & \ddots & \vdots \\ 1 & W_{M_s}^{M_s-1} & \cdots & W_{M_s}^{(M_s-1)^2} \end{bmatrix} \begin{bmatrix} \bar{s}_I^{CS}[0] \\ \bar{s}_I^{CS}[1] \\ \vdots \\ \bar{s}_I^{CS}[M_s-1] \end{bmatrix},$$

$$\bar{x}_Q = \begin{bmatrix} \bar{x}_0^Q \\ \bar{x}_1^Q \\ \vdots \\ \bar{x}_{M_s-1}^Q \end{bmatrix} = F_{M_s} j \cdot \bar{s}_Q^{CS} =$$

$$\frac{1}{\sqrt{M_s}} \begin{bmatrix} 1 & 1 & \cdots & 1 \\ 1 & W_{M_s} & \cdots & W_{M_s}^{M_s-1} \\ \vdots & \vdots & \ddots & \vdots \\ 1 & W_{M_s}^{M_s-1} & \cdots & W_{M_s}^{(M_s-1)^2} \end{bmatrix} \begin{bmatrix} j \cdot \bar{s}_Q^{CS}[0] \\ j \cdot \bar{s}_Q^{CS}[1] \\ \vdots \\ j \cdot \bar{s}_Q^{CS}[M_s-1] \end{bmatrix}.$$

It should be noted that, after above operations, all data symbols in $\bar{x}_I$ are pure real values and all data symbols in $\bar{x}_Q$ are pure imaginary values. Afterwards, a sub-carrier allocation operation is applied to data symbols in $\bar{x}_I$ and $\bar{x}_Q$ in the sub-carrier allocation unit 1205. Said sub-carrier allocation unit 1205 is used to generate a real-imaginary-alternate complex-value data flow and an imaginary-real-alternate complex-value data flow by applying a permutation and combination to the pure imaginary-value data flow and the pure real-value data flow output from the DFT spreading unit. In some embodiments, the sub-carrier allocation unit can generate a real-imaginary-alternate complex-value data flow and an imaginary-real-alternate complex-value data flow by exchanging the data symbols at even positions or odd positions in the pure imaginary-value data flow and the pure real-value data flow. Specifically, in one implementation, the sub-carrier allocation operation is applied to exchange the data symbols at even positions in $\bar{x}_I$ and $\bar{x}_Q$, the resulted symbols are directly modulated onto the corresponding time-frequency resources. If it is assumed that the time indexes of the two signals are 2n and 2n+1, then $$\bar{y}_{2n}^I = \begin{bmatrix} \bar{y}_{2n}^I[0] \\ \bar{y}_{2n}^I[1] \\ \bar{y}_{2n}^I[2] \\ \bar{y}_{2n}^I[3] \\ \vdots \\ \bar{y}_{2n}^I[M_s-1] \end{bmatrix} = f_m(\bar{x}_I, \bar{x}_Q) = \begin{bmatrix} \bar{x}_0^I \\ \bar{x}_1^Q \\ \bar{x}_2^I \\ \bar{x}_3^Q \\ \vdots \\ \bar{x}_{M_s-1}^I \end{bmatrix}, \quad (25)$$

$$\bar{y}_{2n+1}^Q = \begin{bmatrix} \bar{y}_{2n+1}^Q[0] \\ \bar{y}_{2n+1}^Q[1] \\ \bar{y}_{2n+1}^Q[2] \\ \bar{y}_{2n+1}^I[3] \\ \vdots \\ \bar{y}_{2n+1}^Q[M_s-1] \end{bmatrix} = f_m(\bar{x}_Q, \bar{x}_I) = \begin{bmatrix} \bar{x}_0^Q \\ \bar{x}_1^I \\ \bar{x}_2^Q \\ \bar{x}_3^I \\ \vdots \\ \bar{x}_{M_s-1}^Q \end{bmatrix}.$$

It should be noted that, data symbols in $\bar{y}_{2n}^I$ and $\bar{y}_{2n+1}^Q$ exhibit a real-imaginary-alternate manner and an imaginary-real-alternate manner, respectively in Equation (25). In other words, data symbols in $\bar{y}_{2n}^I$ and $\bar{y}_{2n+1}^Q$ are alternately modulated onto the real parts and the imaginary parts of corresponding sub-carriers, respectively. Afterwards, signals $\bar{y}_{2n}^I$ and $\bar{y}_{2n+1}^Q$ are mapped onto $M_s$ continuous or discontinuous sub-carriers by a sub-carrier mapping unit 1206. If it is assumed that the mapped resources are continuous and the initial index of the mapped sub-carriers is 0, then $$\bar{z}_{m,2n}^I = \begin{cases} \bar{y}_{m,2n}^I, & m = 0, 1, \ldots, M_s - 1 \\ 0, & m = M_s, M_s + 1, \ldots, M - 1 \end{cases} \quad (26)$$

$$\bar{z}_{m,2n+1}^Q = \begin{cases} \bar{y}_{m,2n+1}^Q, & m = 0, 1, \ldots, M_s - 1 \\ 0, & m = M_s, M_s + 1, \ldots, M - 1 \end{cases}$$

where M represents the total number of sub-carriers. Afterwards, data symbols in $\{\bar{z}_{m,2n}^I\}$ and $\{\bar{z}_{m,2n+1}^Q\}$ are transmitted after M-point IFFT operation (Inverse Fast Fourier Transform unit 1207 in FIG. 12) and Polyphase filter bank operations (Synthesis Filter Bank Unit 1208 in FIG. 12).

FIG. 14 is a block diagram illustrating an example of a configuration of a receiver in a CS-DFT-s-FBMC/OQAM system according to the second embodiment of the present application.

As shown in FIG. 14, the operations of blocks 1401 to 1412 at the receiver may be understood to be substantially inverse operations to those at the transmitter as described in FIG. 12. At the receiver of FIG. 14, a sub-carrier inverse allocation operation (sub-carrier inverse allocation unit 1406) is applied to a received signal after OQAM demodulation (Analysis Filter Bank unit 1402 and Fast Fourier Transform unit 1403), sub-carrier selection (sub-carrier selection unit 1404) and channel equalization 1405). Each of the two data streams output from the sub-carrier inverse allocation are respectively processed by a real-part extraction and an imaginary-part extraction operation (real-part extraction unit 1407 and imaginary-part extraction unit 1408), as well as an Inverse Discrete Fourier Transform (IDFT) (Inverse Discrete Fourier Transform unit 1409). Each data symbol in one of two data streams output from the IDFT inverse spreading operation is phase rotated (phase rotation unit 1410), the resulted signal along with the other signal are processed by an inverse conjugate symmetric (CS) operation (inverse CS operation unit 1411). In the second embodiment of the present application, the inverse CS operation is the same as that in the first embodiment of the present application.

FIG. 15 is a diagram for explaining an example of a sub-carrier inverse allocation operation according to the second embodiment of the present application.

Referring to FIG. 15, specifically, the two received signals after OQAM demodulation are represented by $\tilde{z}_I$ and $\tilde{z}_Q$, respectively. After sub-carrier selection and channel equalization (sub-carrier selection and channel equalizer unit 1501, which corresponds to the sub-carrier selection unit 1404 and equalizer 1405 in FIG. 14), $\tilde{z}_I$ and $\tilde{z}_Q$ are transformed into two signals, denoted as $\tilde{y}_I$ and $\tilde{y}_Q$, respectively. After sub-carrier inverse allocation operation (sub-carrier inverse allocation unit 1406), $\tilde{y}_I$ and $\tilde{y}_Q$ are transformed into two signals, which are represented by $\tilde{x}_I$ and $\tilde{x}_Q$, respectively. Specifically, the sub-carrier inverse allocation operation is applied to exchange the data symbols at even positions in $\tilde{y}_I$ and $\tilde{y}_Q$, and the said position exchange operations are represented by $$\tilde{x}_I = \begin{bmatrix} \tilde{x}_0^I \\ \tilde{x}_1^I \\ \tilde{x}_2^I \\ \tilde{x}_3^I \\ \vdots \\ \tilde{x}_{M_s-1}^I \end{bmatrix} = f_m(\tilde{y}_I, \tilde{y}_Q) = \begin{bmatrix} \tilde{y}_0^I \\ \tilde{y}_1^Q \\ \tilde{y}_2^I \\ \tilde{y}_3^Q \\ \vdots \\ \tilde{y}_{M_s-1}^I \end{bmatrix}, \quad (27)$$

$$\tilde{x}_Q = \begin{bmatrix} \tilde{x}_0^Q \\ \tilde{x}_1^Q \\ \tilde{x}_2^Q \\ \tilde{x}_3^Q \\ \vdots \\ \tilde{x}_{M_s-1}^Q \end{bmatrix} = f_m(\tilde{y}_Q, \tilde{y}_I) = \begin{bmatrix} \tilde{y}_0^Q \\ \tilde{y}_1^I \\ \tilde{y}_2^Q \\ \tilde{y}_3^I \\ \vdots \\ \tilde{y}_{M_s-1}^Q \end{bmatrix}.$$

Afterwards, the real and imaginary parts of $\tilde{x}_I$ and $\tilde{x}_Q$ are respectively extracted, and the resulted signals are processed by $M_s$-point IDFT inverse spreading operations (Inverse Discrete Fourier Transform unit 1409), which yield:

$$\tilde{s}_I^{CS} = \begin{bmatrix} \tilde{s}_I^{CS}[0] \\ \tilde{s}_I^{CS}[1] \\ \vdots \\ \tilde{s}_I^{CS}[M_s-1] \end{bmatrix} = F_{M_s}^{-1} \Re\{\tilde{x}_I\}, \quad (28)$$

$$\tilde{s}_Q^{CS} = \begin{bmatrix} \tilde{s}_Q^{CS}[0] \\ \tilde{s}_Q^{CS}[1] \\ \vdots \\ \tilde{s}_Q^{CS}[M_s-1] \end{bmatrix} = F_{M_s}^{-1} \Im\{\tilde{x}_Q\}.$$

Finally, a phase rotation is applied to each data symbol in $\tilde{s}_Q^{CS}$ (referring to FIG. 14), which gives:

$$(-j)\cdot\tilde{s}_Q^{CS} = [(-j)\cdot\tilde{s}_Q^{CS}[0], (-j)\cdot\tilde{s}_Q^{CS}[0], \ldots, (-j)\cdot\tilde{s}_Q^{CS}[M_s-1]]^T. \quad (29)$$

$\tilde{s}_I^{CS}$ along with $(-j)\cdot\tilde{s}_Q^{CS}$ are input to an inverse CS operation unit 1411. After a parallel-serial conversion in a parallel/serial conversion unit 1412, the estimated complex-value modulated data is output.

Third Embodiment

In the third embodiment of the present application, the conjugate symmetric (CS) operation and the DFT spreading operation are the same as the conjugate symmetric (CS) operation and the DFT spreading operation described in the first embodiment and the second embodiment of the present application. The difference lies in that, in the third embodiment of the present application, after being processed by conjugate symmetric (CS) operation and prior to DFT spreading operation, data symbols are pre-coded by pre-defined pre-coding matrices.

FIG. 16 is a block diagram illustrating an example of a configuration of a transmitter in a CS-DFT-s-FBMC/OQAM system according to a third embodiment of the present application, wherein the transmitter of FIG. 16 generates and transmits pre-coded conjugate symmetric DFT spread FBMC/OQAM (P-CS-DFT-s-FBMC/OQAM) signals.

As shown in FIG. 16, the complex-value modulated data are input to a conjugate symmetric (CS) operation unit after being converted in a serial/parallel converter unit 1601. After conjugate symmetric (CS) operations, the resulted signals are processed by a pre-coding operation in a pre-coding unit 1603. Afterwards, each of two output data streams after pre-coding is separately input to a corresponding Ms-point Discrete Fourier Transform unit 1604 for DFT spreading, the generated two signals are directly modulated onto mapped sub-carriers after sub-carrier mapping in sub-carrier mapping units 1605. The method for OQAM modulation is exactly the same as that presented in the first embodiment. The operations of the other blocks 1505, 1607, 1608 that have not been described are the same as those of the corresponding blocks at the transmitter of FIG. 7, so a detailed description thereof will be omitted.

In the third embodiment of the present application, the conjugate symmetric (CS) operation and the DFT spreading operation are exactly the same as the conjugate symmetric (CS) operation and the DFT spreading operation described in the first embodiment and the second embodiment of the present application. The difference lies in that, in the third embodiment of the present application, prior to a DFT spreading operation, data symbols are pre-coded right after a conjugate symmetric (CS) operation.

The two signals output from the conjugate symmetric (CS) operations are separately represented by $\bar{s}_I^{CS}$ and $\bar{s}_Q^{CS}$. Thus the resulted signals after performing pre-coding operations on $\bar{s}_I^{CS}$ and $\bar{s}_Q^{CS}$ are given as:

$$\bar{p}_I = \begin{bmatrix} \bar{p}_0^I \\ \bar{p}_1^I \\ \vdots \\ \bar{p}_{M_s-1}^I \end{bmatrix} = \quad (30)$$

$$P_{M_s}^I \bar{s}_I^{CS} = \begin{bmatrix} p_{0,0}^I & p_{0,1}^I & \cdots & p_{0,M_s-1}^I \\ p_{1,0}^I & p_{1,1}^I & \cdots & p_{1,M_s-1}^I \\ \vdots & \vdots & \ddots & \vdots \\ p_{M_s-1,0}^I & p_{M_s-1,1}^I & \cdots & p_{M_s-1,M_s-1}^I \end{bmatrix} \begin{bmatrix} \bar{s}_I^{CS}[0] \\ \bar{s}_I^{CS}[1] \\ \vdots \\ \bar{s}_I^{CS}[M_s-1] \end{bmatrix},$$

$$\bar{p}_Q = \begin{bmatrix} \bar{p}_0^Q \\ \bar{p}_1^Q \\ \vdots \\ \bar{p}_{M_s-1}^Q \end{bmatrix} =$$

$$P_{M_s}^Q \bar{s}_Q^{CS} = \begin{bmatrix} p_{0,0}^Q & p_{0,1}^Q & \cdots & p_{0,M_s-1}^Q \\ p_{1,0}^Q & p_{1,1}^Q & \cdots & p_{1,M_s-1}^Q \\ \vdots & \vdots & \ddots & \vdots \\ p_{M_s-1,0}^Q & p_{M_s-1,1}^Q & \cdots & p_{M_s-1,M_s-1}^Q \end{bmatrix} \begin{bmatrix} \bar{s}_Q^{CS}[0] \\ \bar{s}_Q^{CS}[1] \\ \vdots \\ \bar{s}_Q^{CS}[M_s-1] \end{bmatrix}.$$

In some embodiments, pre-coding matrixes $P_{M_s}^I$ and $P_{M_s}^Q$ may be constructed as:

$$P_{M_s}^I = F_{M_s}^{-1} \Lambda_{M_s}^I F_{M_s},$$

$$P_{M_s}^Q = F_{M_s}^{-1} \Lambda_{M_s}^Q F_{M_s}. \quad (31)$$

where $F_{M_s}$ is a DFT matrix with size of $M_s \times M_s$, the expression of which is the same as that given in equation (5). $\Lambda_{M_s}^I$ is a diagonal matrix, of which the off-diagonal entries are all 0s, the diagonal elements at odd positions are all 1s, and the diagonal elements at even positions are all js. This matrix is represented by:

$$\Lambda_{M_s}^I = \begin{pmatrix} 1 & 0 & 0 & \cdots & 0 \\ 0 & j & 0 & \cdots & 0 \\ 0 & 0 & 1 & \cdots & 0 \\ \vdots & \vdots & \vdots & \ddots & \vdots \\ 0 & 0 & 0 & \cdots & j \end{pmatrix}. \quad (32)$$

$\Lambda_{M_s}^Q$ is a diagonal matrix, of which the off-diagonal elements are all 0s, the diagonal elements at even positions are all 1s, and the diagonal elements at odd positions are all js. This matrix is represented by:

$$\Lambda_{M_s}^Q = \begin{pmatrix} j & 0 & 0 & \cdots & 0 \\ 0 & 1 & 0 & \cdots & 0 \\ 0 & 0 & j & \cdots & 0 \\ \vdots & \vdots & \vdots & \ddots & \vdots \\ 0 & 0 & 0 & \cdots & 1 \end{pmatrix}. \quad (33)$$

Afterwards, $\bar{p}_I$ and $\bar{p}_Q$ are separately processed by a DFT matrix with size of $M_s \times M_s$, yielding $\bar{x}_I$ and $\bar{x}_Q$, represented by:

$$\bar{x}_I = \begin{bmatrix} \bar{x}_0^I \\ \bar{x}_1^I \\ \vdots \\ \bar{x}_{M_s-1}^I \end{bmatrix} = \quad (34)$$

$$F_{M_s}\bar{p}_I = \frac{1}{\sqrt{M_s}} \begin{bmatrix} 1 & 1 & \cdots & 1 \\ 1 & W_{M_s} & \cdots & W_{M_s}^{M_s-1} \\ \vdots & \vdots & \ddots & \vdots \\ 1 & W_{M_s}^{M_s-1} & \cdots & W_{M_s}^{(M_s-1)^2} \end{bmatrix} \begin{bmatrix} \bar{p}_0^I \\ \bar{p}_1^I \\ \vdots \\ \bar{p}_{M_s-1}^I \end{bmatrix},$$

$$\bar{x}_Q = \begin{bmatrix} \bar{x}_0^Q \\ \bar{x}_1^Q \\ \vdots \\ \bar{x}_{M_s-1}^Q \end{bmatrix} =$$

$$F_{M_s}\bar{p}_Q = \frac{1}{\sqrt{M_s}} \begin{bmatrix} 1 & 1 & \cdots & 1 \\ 1 & W_{M_s} & \cdots & W_{M_s}^{M_s-1} \\ \vdots & \vdots & \ddots & \vdots \\ 1 & W_{M_s}^{M_s-1} & \cdots & W_{M_s}^{(M_s-1)^2} \end{bmatrix} \begin{bmatrix} \bar{p}_0^Q \\ \bar{p}_1^Q \\ \vdots \\ \bar{p}_{M_s-1}^Q \end{bmatrix}.$$

It should be noted that, after above operations, all data symbols in $\bar{x}_I$ are in a real-imaginary-alternate manner and all date symbols in $\bar{x}_Q$ are in an imaginary-real-alternate manner. Finally, $\bar{x}_I$ and $\bar{x}_Q$ are directly modulated onto mapped sub-carriers after the sub-carrier mapping operation.

FIG. 17 is a diagram illustrating an example of a configuration of a receiver in a CS-DFT-s-FBMC/OQAM system according to the third embodiment of the present application, wherein the receiver of FIG. 17 receives Precoded Conjugate Symmetric DFT spread FBMC/OQAM (P-CS-DFT-s-FBMC/OQAM) signals.

As shown in FIG. 17, the operations of blocks 1701 to 1712 at the receiver may be understood to be substantially inverse operations of those at the transmitter as described in FIG. 16. At the receiver of FIG. 17, after OQAM demodulations (Analysis Filter Bank unit 1702 and Fast Fourier Transform unit 1703), sub-carrier selections (sub-carrier selection unit 1704) and channel equalizations 1705, real/imaginary parts of the received signals are extracted (real-part extraction unit 1706 and imaginary-part extraction unit 1707) with phase rotations (phase rotation unit 1708) applied to the corresponding data symbols in the two data streams. Inverse Discrete Fourier Transform (IDFT) operations (Inverse Discrete Fourier Transform unit 1709) are applied to the data output from the above processes. The IDFT spread signals are then processed by an inverse pre-coding operation (inverse pre-coding unit 1710).

Specifically, if the two data streams output from the OQAM demodulations, the sub-carrier selections and the channel equalizations are denoted as $\tilde{x}_I = [\tilde{x}_0^I, \tilde{x}_1^I, \ldots \tilde{x}_{M_s-1}^I]^T$ and $\tilde{x}_Q = [\tilde{x}_0^Q, \tilde{x}_1^Q, \ldots \tilde{x}_{M_s-1}^Q]^T$, respectively, then:

$$\tilde{q}_I = \begin{bmatrix} \tilde{q}_0^I \\ \tilde{q}_1^I \\ \vdots \\ \tilde{q}_{M_s-1}^I \end{bmatrix} = F_{M_s}^{-1} \begin{bmatrix} R\{\tilde{x}_0^I\} \\ j \cdot F\{\tilde{x}_1^I\} \\ \vdots \\ j \cdot F\{\tilde{x}_{M_s-1}^I\} \end{bmatrix}, \quad (35)$$

-continued $$\tilde{q}_Q = \begin{bmatrix} \tilde{q}_0^Q \\ \tilde{q}_1^Q \\ \vdots \\ \tilde{q}_{M_s-1}^Q \end{bmatrix} = F_{M_s}^{-1} \begin{bmatrix} j \cdot \mathcal{F}\{\tilde{x}_0^Q\} \\ \mathcal{R}\{\tilde{x}_1^Q\} \\ \vdots \\ \mathcal{R}\{\tilde{x}_{M_s-1}^Q\} \end{bmatrix}.$$

Afterwards, the inverse pre coding operations are applied to $\tilde{q}_I$ and $\tilde{q}_Q$ respectively, the corresponding results can be expressed as:

$$\tilde{s}_I^{CS} = \begin{bmatrix} \tilde{s}_I^{CS}[0] \\ \tilde{s}_I^{CS}[1] \\ \vdots \\ \tilde{s}_I^{CS}[M_s-1] \end{bmatrix} = (P_{M_s}^I)^{-1} \tilde{q}_I, \quad (36)$$

$$\tilde{s}_Q^{CS} = \begin{bmatrix} \tilde{s}_Q^{CS}[0] \\ \tilde{s}_Q^{CS}[1] \\ \vdots \\ \tilde{s}_Q^{CS}[M_s-1] \end{bmatrix} = (P_{M_s}^Q)^{-1} \tilde{q}_Q.$$

Finally, $\tilde{s}_I^{CS}$ along with $\tilde{s}_Q^{CS}$ a are input to inverse CS operation units 1711, and then parallel to serial converted in a parallel/serial conversion unit 1712, which outputs the estimated complex-value modulated data. In the third embodiment of the present application, the inverse CS operation is the same as that presented in the first embodiment and the second embodiment of the present application.

Fourth Embodiment

Compared with the first embodiment, the second embodiment and the third embodiment of the present application, in the fourth embodiment of the present application, only one data stream is output from the serial-parallel conversion and the conjugate symmetric (CS) operations. After said one data stream is processed by a DFT spreading operation and a sub-carrier permutation operation, two data streams are output and transmitted after OQAM modulations.

FIG. 18 is a block diagram illustrating an example of a configuration of a transmitter in a CS-DFT-s-FBMC/OQAM system according to the fourth embodiment of the present application.

As shown in FIG. 18, the complex-value modulated data is converted by a serial/parallel conversion unit 1601 and processed by a conjugate symmetric (CS) DFT spreading operation (CS operation unit 1802 and Discrete Fourier Transform unit 1803) and a sub-carrier permutation operation (sub-carrier permutation unit 1804), and then the resulted two data streams are directly modulated onto the mapped sub-carriers. The method for OQAM modulation is the same as that described in the first embodiment. The operations of the other blocks 1805, 1806, 1807 that have not been described are the same as those of the corresponding blocks at the transmitter of FIG. 7, so a detailed description thereof will be omitted.

FIG. 19 is a diagram for explaining an example of applying a CS operation to given data symbols according to the fourth embodiment of the present application. Said CS operation differs from that described in the first embodiment of the present application in that, the CS operation in the fourth embodiment of the present application does not contain any data separation modules.

As shown in FIG. 19, the input $M_r$ complex-value modulated data symbols could be represented by $\bar{d}=[d_0, d_1, \ldots, d_{M_r-1}]^T$. A data replication module 1901 applies data replication operation and power allocation operation to the input data and output two complex-value modulated data streams after the power allocation operations. The two data streams are represented by:

$$\bar{s}_I = [s_I[0], s_I[1], \ldots, s_I[M_r-1]]^T = \alpha_I \bar{d}$$

$$\bar{s}_Q = [s_Q[0], s_Q[1], \ldots, s_Q[M_r-1]]^T = \alpha_Q \bar{d}. \quad (37)$$

where $\alpha_I$ and $\alpha_Q$ are power allocation factors of the two complex-value modulated data, respectively. It should be noted that, the present application should not be limited to the specific method for power allocation as long as the total system transmit power meets the demand of system design and receiver is aware of the power allocation method applied by the transmitter for data demodulation. One of the two complex-value modulated data after the data replication operation is input into a data conjugate calculation module 1902, and the other one is input into a data symmetric calculation module 1903. Specifically, the data conjugate calculation module 1902 applies a conjugate calculation to the input data, and the output thereof may be represented by:

$$\bar{s}_Q^C = [s_Q^*[0], s_Q^*[1], \ldots, s_Q^*[M_r-1]]^T. \quad (38)$$

The data output from the data conjugate calculation module 1902 is also input to the data symmetric calculation module 1903. Said data symmetric calculation module 1903 could apply a rotation operation to any one of the two input complex-value modulated data streams and combine the rotated one and the other one in a predetermined manner. In some embodiments, the data symmetric calculation module 1903 applies a rotation operation to the data symbols output from the data conjugate calculation module first, which is denoted by $\bar{s}_Q^S = f_{usd}(\bar{s}_Q^C)$, and is mathematically expressed as:

$$\bar{s}_Q^S = f_{usd}(\bar{s}_Q^C) = [s_Q^*[M_r-1], s_Q^*[M_r-2], \ldots, s_Q^*[0]]^T. \quad (39)$$

Afterwards, the data symmetric calculation module 1903 applies combination and zero padding operations to the input data from the data replication module 1901 and the input data from the data conjugate calculation module 1902 that has been rotated, and outputs a conjugate symmetric complex-value modulated data. Specifically, in one implementation, the conjugate symmetric complex-value modulated data may be represented by:

$$\bar{s}^{CS} = f_{cs}(\bar{s}_I, \bar{s}_Q^S) \quad (40)$$

$$= \left[[\bar{s}_I]^T, 0, [\bar{s}_Q^S]^T\right]^T$$

$$= [s_I[0], s_I[1], \ldots, s_I[M_r-1], 0, s_Q^*[M_r-1],$$

$$s_Q^*[M_r-2], \ldots, s_Q^*[0]]^T,$$

specifically, equation (40) represents that zero padding is applied at the Direct Current (DC) component of a given input data. Besides, in another implementation, the conjugate symmetric complex-value modulated data could also be represented by:

$$\tilde{s}^{CS} = f_{cs}(\bar{s}_I, \bar{s}_Q^S) \quad (41)$$
$$= [0, [\bar{s}_I]^T, 0, [\bar{s}_Q^S]^T]^T$$
$$= [0, s_I[0], s_I[1], \ldots, s_I[M_r-1], 0, s_Q^*[M_r-1],$$
$$s_Q^*[M_r-2], \ldots, s_Q^*[0]]^T,$$

Equation (41) represents that the zero padding operation is simultaneously applied at the front of each of the two data streams to be combined.

Afterwards, a DFT spreading operation is applied to the data output from the data symmetric calculation module 1903. Take the complex-value modulated data that has been processed by the conjugate symmetric (CS) operation according to equation (41) for example, after performing $2M_s$-point ($2M_s=2M_r+2$) DFT spreading ($F_{2M_s}$) on $\bar{s}^{CS}$, the resulted data vector can be expressed as:

$$\bar{x} = \begin{bmatrix} \bar{x}_0 \\ \bar{x}_1 \\ \vdots \\ \bar{x}_{2M_s-1} \end{bmatrix} = F_{2M_s}\bar{s}^{CS}. \quad (42)$$

where $F_{2M_s}$ is a DFT matrix with size of $2M_s \times 2M_s$ with power normalization. Reference can be made to equation (5) for the specific expression of the matrix. It should be noted that, after performing conjugate symmetric operation and the DFT spreading operation on the complex-value modulated data symbols, the resulted data symbols are pure real-valued data symbols. Then, a sub-carrier permutation operation is then applied on $\bar{x}_I$, which outputs two data streams represented by $[\bar{x}_I, \bar{x}_Q]=f_{permutation}(\bar{x})$. Specifically, the sub-carrier permutation operation comprises: adjusting and exchanging the data symbols in the input data stream in a predetermined manner and dividing the resulted data symbols into two data streams with equal length. Specially, the said predetermined manner may be directly dividing the obtained data symbols into two data streams of equal length without any adjustment and/or position exchange. It should be noted that, the present application should not be limited to the specific method for the sub-carrier permutation operation; as long as it is guaranteed that the receiver is aware of the method for the sub-carrier permutation operation applied by the transmitter for data demodulation. Afterwards, $\bar{x}_I$ and $\bar{x}_Q$ are alternately modulated onto the real parts and the imaginary parts of corresponding sub-carriers respectively and then transmitted with certain time offset.

FIG. 20 is a block diagram illustrating an example of a receiver in a CS-DFT-s-FBMC/OQAM system according to the fourth embodiment of the present application.

As shown in FIG. 20, the operations of blocks 2001 to 2011 at the receiver may be understood to be substantially inverse operations to those at the transmitter as described in FIG. 18. At the receiver of FIG. 20, in addition to performing corresponding OQAM demodulations (Analysis Filter Bank unit 2002 and Fast Fourier Transform unit 2003), sub-carriers selections (Sub-Carrier Selection unit 2004) and channel equalizations (Equalizer 2005) on the received symbols, CS-IDFT inverse spreading operations corresponding to the CS-DFT spreading operations at the transmitter are also needed.

In some embodiments, the CS-IDFT inverse spreading operation comprises two parts, an IDFT inverse spreading operation and an inverse conjugate symmetric (CS) operation. If it is assumed that the two received signals after sub-carrier selections and the channel equalizations are $\tilde{y}_I=[\tilde{y}_0^I, \tilde{y}_1^I, \ldots, \tilde{y}_{M_s-1}^I]^T$ and $\tilde{y}_Q=[\tilde{y}_0^Q, \tilde{y}_1^Q, \ldots, \tilde{y}_{M_s-1}^Q]^T$, after per sub-carrier phase rotation conducted in the phase rotation units 2006 on $\tilde{y}_I$ and $\tilde{y}_Q$, two signals $\tilde{x}_I$ and $\tilde{x}_Q$ are generated and may be represented by:

$$\tilde{x}_I = \begin{bmatrix} \tilde{y}_0^I \\ (-j)\cdot\tilde{y}_1^I \\ \tilde{y}_2^I \\ (-j)\cdot\tilde{y}_3^I \\ \vdots \\ (-j)\cdot\tilde{y}_{M_s-1}^I \end{bmatrix}, \tilde{x}_Q = \begin{bmatrix} (-j)\cdot\tilde{y}_0^Q \\ \tilde{y}_1^Q \\ (-j)\cdot\tilde{y}_2^Q \\ \tilde{y}_3^Q \\ \vdots \\ \tilde{y}_{M_s-1}^Q \end{bmatrix}. \quad (43)$$

Afterwards, the real parts of both the data streams $\tilde{x}_I$ and $\tilde{x}_Q$ are respectively extracted (real-part extraction unit 2007) and then processed by an inverse sub-carrier permutation operation (inverse sub-carrier permutation unit 2008), resulting in only one data stream represented by $\tilde{x}=f_{permutation}^{-1}(\Re\{\tilde{x}_I\}, \Re\{\tilde{x}_Q\})$. An inverse sub-carrier permutation operation $f_{permutation}^{-1}(\cdot)$ is the inverse operation to the sub-carrier permutation operation $f_{permutation}(\cdot)$ employed at the transmitter. $\tilde{x}$ is then processed by $2M_s$-point IDFT inverse spreading operations (Inverse Discrete Fourier Transform unit 2009), and the result may be represented by:

$$\tilde{s}^{CS} = \begin{bmatrix} \tilde{s}^{CS}[0] \\ \tilde{s}^{CS}[1] \\ \vdots \\ \tilde{s}^{CS}[2M_s-1] \end{bmatrix} = F_{2M_s}^{-1}\tilde{x}. \quad (44)$$

where $(\cdot)^{-1}$ is a matrix inversion operation, and $F_{2M_s}$ is a DFT matrix with size of $2M_s \times 2M_s$. An inverse conjugate symmetric (CS) operation (inverse CS operation unit 2010) is then applied on $\tilde{s}^{CS}$.

FIG. 21 is a diagram for explaining an example of an inverse CS operation on given data symbols according to the fourth embodiment of the present application.

Said inverse CS operation differs from that in the first embodiment of the present application in that, the inverse CS operation in the fourth embodiment of the present application does not contain any data merging modules.

As shown in FIG. 21, $\tilde{s}^{CS}$ is input into a data separation module 2101 first, and the data separation module 2101 outputs two data streams with equal length. Specifically, if the operations and calculations applied by the data symmetric calculation module at the transmitter are conducted according to equation (41), the data separation module 2101 outputs two complex-value data streams with equal length and are represented by $\tilde{s}_A^S$ and $\tilde{s}_B^{CS}$, respectively. Specifically, $$\tilde{s}_A^S = [\tilde{s}_A^S[0], \tilde{s}_A^S[1], \ldots, \tilde{s}_A^S[M_r-1]]^T \quad (45)$$
$$= [\tilde{s}^{CS}[1], \tilde{s}^{CS}[2], \ldots, \tilde{s}^{CS}[M_s-1]]^T,$$
$$\tilde{s}_B^{CS} = [\tilde{s}_B^{CS}[0], \tilde{s}_B^{CS}[1], \ldots, \tilde{s}_B^{CS}[M_r-1]]^T$$
$$= [\tilde{s}^{CS}[M_s+1], \tilde{s}_I^{CS}[M_s+2], \ldots, \tilde{s}_I^{CS}[2M_s-1]]^T.$$

Afterwards, $\tilde{s}_A^S$ is input to a data replication module 2102 and then output to a data symmetric merging module 2104. Said data replication module 2102 does not perform any calculations or operations on the input data. $\tilde{s}_B^{CS}$ is input to a data conjugate calculation module 2103. Specifically, a conjugate calculation is applied on the input data by the data conjugate calculation module 2103, and the result may be represented by:

$$\tilde{s}_B^S = [\tilde{s}_B^S[0], \tilde{s}_B^S[1], \ldots, \tilde{s}_B^S[M_r-1]]^T \qquad (46)$$
$$= (\tilde{s}_B^{CS})^* = [(\tilde{s}_B^{CS})^*[0], (\tilde{s}_B^{CS})^*[1], \ldots, (\tilde{s}_B^{CS})^*[M_r-1]],$$

Afterwards, $\tilde{s}_A^S$ and $\tilde{s}_B^S$ are input to a corresponding data symmetric merging module 2104, respectively. Specifically, the data symmetric merging module 2104 applies a rotation operation to the input data from the data conjugate calculation module 2103 first, and the operation is denoted by $f_{usd}(\tilde{s}_B^S)$, which is the same as the operation described in equation (11). Said data symmetric merging module 2104 then applies a merging operation to the input data from the data replication module 2102 and the rotated input data from the data conjugate calculation module 2103, and the operation may be represented by:

$$\tilde{s}_I = \frac{1}{\alpha_I} \cdot \tilde{s}_A^S + \frac{1}{\alpha_Q} \cdot f_{usd}(\tilde{s}_B^S) \qquad (47)$$
$$= \left[ \frac{1}{\alpha_I} \cdot \tilde{s}_A^S[0] + \frac{1}{\alpha_Q} \cdot \tilde{s}_B^S[M_r-1], \frac{1}{\alpha_I} \cdot \tilde{s}_A^S[1] + \frac{1}{\alpha_Q} \cdot \right.$$
$$\left. \tilde{s}_B^S[M_r-2], \ldots, \frac{1}{\alpha_I} \cdot \tilde{s}_A^S[M_r-1] + \frac{1}{\alpha_Q} \cdot \tilde{s}_B^S[0] \right]^T.$$

where $\alpha_I$ and $\alpha_Q$ thereof are corresponding power allocation factors employed at the transmitter.

FIG. 22 is a flow chart illustrating an example of a method of transmitting CS-DFT-s-FBMC/OQAM signals according to a plurality of embodiments of the present application.

As shown in FIG. 22, in step 2210, a conjugate symmetric Discrete Fourier Transform (CS-DFT) spreading operation is applied on the input first complex-value data flow to output two data streams.

In step 2220, the two output data streams are mapped to corresponding sub-carriers, respectively.

In step 2230, an Offset Quadrature Amplitude Modulation (OQAM) is applied on the data symbols, which are mapped to corresponding sub-carriers, for generating an OQAM signal.

Finally, in step 2240, the OQAM signal is transmitted.

Said CS-DFT spreading operation in step 2210 may be performed according to the first to fourth embodiments of the present application as described above.

FIG. 23 is a flow chart illustrating an example of a method of receiving CS-DFT-s-FBMC/OQAM signals according to a plurality of embodiments of the present application.

As shown in FIG. 23, an Offset Quadrature Amplitude Modulation (OQAM) signal is received in step 2310.

In step 2320, a demodulation is applied on the received OQAM signal for generating two complex-value data streams.

In step 2330, two first complex-value data streams are obtained by selecting the two complex-value data streams on corresponding mapped sub-carriers.

Alternately, in step 2340, both of the two first complex-value data streams nay be equalized.

In step 2350, Conjugate Symmetric Inverse Discrete Fourier Transform (CS-IDFT) inverse spreading operations are applied on the two equalized first complex-value data streams for generating one complex-value data stream.

Said CS-IDFT inverse spreading operation may be performed according to the first to fourth embodiments of the present application as described above.

FIG. 24 is a block diagram illustrating an entity 2400 applicable to a transmitter or receiver according to an embodiment of the present application.

Referring to FIG. 24, the entity 2400 may be configured as a transmitting terminal device, e.g., a transmitter, as well as a receiving terminal device, e.g., a receiver, and may also be configured as a device having functions of both transmitting and receiving, such as a transceiver.

As shown in FIG. 24, the entity 2400 comprises a processor 2401, a memorizer 2402 which is coupled to the processor 2401, and a suitable Radio Frequency (RF) antenna 2404 which is coupled to the processor 2401. A program 2403 is stored in the memorizer 2402. An antenna 2404 is suitable for two-way wireless communication. It should be noted that, although only one antenna 2404 is illustrated in FIG. 24, a plurality of antennas may be configured in practice. The entity 2400 may be coupled, through data paths, to one or more external networks or systems, for example, internet.

Said program 2403 may comprises program commands. When the program commands are executed by corresponding processor 2401, the entity 2400 may operate according to a plurality of exemplary embodiments of the present application.

The embodiments of the present application may be implemented by computer software which could be executed by the processor 2401 of the entity 2400, or hardware, or the combination of software and hardware.

The memorizer 2402 may be any appropriate type of memorizer suitable for local technical environment, and may be achieved by any appropriate data-storage technology, for example, a memory device and system based on semiconductor, a magnetic memory device and system, an optical memory device and system, a fixed memorizer and a removable memorizer, which are only some non-restrictive examples. Although only one memorizer is illustrated in the entity 2400, a plurality of physically independent memory cells may be contained by the entity 2400. Said processor 2401 may be any appropriate type of processor suitable for local technical environment, and may comprise one or more of the followings: a general-purpose computer, a special-purpose computer, a microprocessor, a digital signal processor and a processor based on multi-core architecture, which are only some non-restrictive examples.

Where the entity 2400 is configured as a transmitting terminal device, in some embodiments, the processor 2401 is configured for generating OQAM signals and the antenna 2404 is configured for transmitting OQAM signals.

Where the entity 2400 is configured as a receiving terminal device, in some embodiments, the antenna 2404 is configured for receiving OQAM signals and the processor 2401 is configured for applying demodulations and various inverse operations corresponding to those of transmitting OQAM signals.

It should be comprehended that, each unit comprised in the entity 2400 is configured for implementing the exemplary embodiments disclosed in the present application. Therefore, the above operations and feathers described combining FIGS. 7-23 are also applicable to the entity 2400 and the units therein, and a detailed description thereof will be omitted herein.

The modules described in the embodiments of the present invention can be implemented using certain hardware, software, or a combination thereof. In addition, the modules described herein may be implemented in a processor. For example, it may be described as: a processor comprises a conjugate symmetric operation unit. The names of these modules in some cases do not intend to introduce any limitation to the modules themselves. For example, the conjugate symmetric operation unit may also be described as "a unit for applying a conjugate symmetric operation to data symbols".

In addition, there is provided a computer readable storage media, which may be the computer readable storage media involved in a base station or a user's device as discussed in the above, or a computer readable storage media individually exists rather than being fitted into any terminal. There is one or more computer programs stored on the computer readable storage media, and one or more processors run the one or more computer programs to perform the method for transmitting or receiving signals based on a filter bank.

The above description is only the preferred embodiments of the present application and the description of the principles of applied techniques. It will be appreciated by those skilled in the art that, the scope of the claimed solutions as disclosed in the present application are not limited to those consisted of particular combinations of features described above, but should cover other solutions formed by any combination of features from the foregoing or an equivalent thereof without departing from the inventive concepts, for example, a solution formed by replacing one or more features as discussed in the above with one or more features with similar functions disclosed (but not limited to) in the present application.

The invention claimed is:

1. A transmission device in a wireless communication system, comprising:
 a spreading unit configured to generate two data flows by applying a conjugate symmetric discrete fourier transform (CS-DFT) spreading operation to a first complex-value data flow input thereto, the CS-DFT spreading operation comprising a conjugate symmetric operation and a subsequent discrete fourier transform (DFT) spreading operation;
 a sub-carrier mapping unit configured to map each of the two data flows to sub-carriers; and
 a modulator configured to generate offset quadrature amplitude modulation (OQAM) signals by applying a quadrature amplitude modulation operation to the data flows mapped on sub-carriers.

2. The transmission device of claim 1, wherein the spreading unit comprises:
 a conjugate symmetric operation unit configured to generate two conjugate symmetric complex-value data flows by applying the conjugate symmetric operation to the first complex-value data flow input thereto; and
 a discrete fourier transform (DFT) spreading unit configured to generate two pure real-valued data flows by applying the DFT spreading operation to each of the two generated conjugate symmetric complex-value data flows.

3. The transmission device of claim 2, wherein the modulator is alternately configured to modulate the two pure real-valued data flows onto real parts and imaginary parts of the mapped sub-carriers.

4. The transmission device of claim 1, wherein the spreading unit comprises:
 a conjugate symmetric operation unit configured to generate two conjugate symmetric complex-value data flows by applying the conjugate symmetric operation to the first complex-value data flow input thereto;
 a phase rotation unit configured to rotate the phase of one of the two conjugate symmetric complex-value data flows; and
 a DFT spreading unit configured to generate a pure imaginary-valued data flow by applying the DFT spreading operation to the complex-value data flow of which the phase is rotated, and to generate a pure real-valued data flow by applying the DFT spreading operation to the other one of the generated complex-value data flows, of which the phase is not rotated.

5. The transmission device of claim 4, wherein the phase rotation unit is used for multiplying each symbol element in the first complex-value data flow with an imaginary unit j.

6. The transmission device of claim 1, further comprising a sub-carrier allocation unit configured to respectively generate a real-imaginary-alternate complex-value data flow and an imaginary-real-alternate complex-value data flow by permuting and to combine a pure imaginary-valued data flow and a pure real-valued data flow output from the DFT spreading unit, wherein the sub-carrier allocation unit is used for generating a real-imaginary-alternate complex-value data flow and an imaginary-real-alternate complex-value data flow by exchanging data symbols at even positions or odd positions in the pure imaginary-valued data flow and the pure real-valued data flow, respectively.

7. The transmission device of claim 4, wherein the modulator directly is configured to modulate a real-imaginary-alternate complex-value data flow and an imaginary-real-alternate complex-value data flow onto the mapped sub-carriers.

8. The transmission device of claim 1, wherein the spreading unit comprises:
 a conjugate symmetric operation unit configured to generate two conjugate symmetric complex-value data flows by applying the conjugate symmetric operation to the first complex-value data flow input thereto;
 a pre-coding unit configured to pre-code each of the two conjugate symmetric complex-value data flows; and
 a DFT spreading unit configured to generate a real-imaginary-alternate complex-value data flow and an imaginary-real-alternate complex-value data flow by applying the DFT spreading operation to the two pre-coded complex-value data flows.

9. The transmission device of claim 8, wherein the modulator is configured to directly modulate the real-imaginary-alternate complex-value data flow and the imaginary-real-alternate complex-value data flow to the mapped sub-carriers.

10. The transmission device of claim 1, wherein the spreading unit comprises:
 a conjugate symmetric operation unit configured to generating a conjugate symmetric complex-value data flow by applying the conjugate symmetric operation to the first complex-value data flow input thereto;
 a DFT spreading unit configured to generate a pure real-valued data flow by applying the DFT spreading operation to the conjugate symmetric complex-value data flow; and
 a sub-carrier permutation unit configured to adjust and exchange positions of each data symbol in the pure real-valued data flow in a predetermined manner and dividing the position adjusted data symbols into two pure real-valued data flows with equal length.

11. The transmission device of claim 10, wherein the modulator is configured to alternately modulate the two pure real-valued data flows with equal length onto real parts and imaginary parts of the mapped sub-carriers.

12. A reception device in a wireless communication system, comprising:
   a demodulator configured to generate two complex-value data flows by demodulating offset quadrature amplitude modulation (OQAM) signals;
   a sub-carrier selection unit configured to select two first complex-value data flows which are from the two complex-value data flows on mapped sub-carriers; and
   an inverse spreading unit configured to generate a complex-value data flow by applying a conjugate symmetric inverse discrete fourier transform (CS-IDFT) operation to the two first complex-value data flows, the CS-IDFT operation comprising an inverse discrete fourier transform (IDFT) spreading operation and a subsequent inverse conjugate symmetric operation.

13. The reception device of claim 12, wherein the inverse spreading unit comprises:
   a phase rotation unit configured to rotate a phase of each of the two first complex-value data flows to generate two second complex-value data flows;
   a real/imaginary part extraction unit configured to extract a real part of each data symbol in the two second complex-value data flows;
   an inverse discrete fourier transform (IDFT) spreading unit configured to generate two third complex-value data flows by applying the IDFT spreading operation to each of the real parts of the two second complex-value data flows; and
   an inverse conjugate symmetric operation unit configured to generate a complex-value data flow by applying the inverse conjugate symmetric operation to the two third complex-value data flows.

14. The reception device of claim 13, wherein the phase rotation unit is configured to alternately multiply data symbols in one of the two first complex-value data flows with 1 and −j and to alternately multiply data symbols in the other one of the two first complex-value data flows with −j and 1.

15. The reception device of claim 12, wherein the inverse spreading unit comprises:
   a sub-carrier inverse allocation unit configured to permute and combine the two first complex-value data flows to generate two fourth complex-value data flows;
   a real/imaginary part extraction unit configured to extract real parts of one of the two fourth complex-value data flows and extracting imaginary parts of the other one of the two fourth complex-value data flows;
   an IDFT spreading unit configured to generate two fifth complex-value data flows by applying the IDFT spreading operation to the real parts and imaginary parts extracted from the two fourth complex-value data flows, respectively;
   a phase rotation unit configured to rotate a phase of one of the two fifth complex-value data flows; and
   an inverse conjugate symmetric operation unit configured to generate a complex-value data flow by applying the inverse conjugate symmetric operation to one of the two fifth complex-value data flows whose phases are rotated and the other one of the two fifth complex-value data flows whose phases are not rotated.

16. The reception device of claim 15, wherein the phase rotation unit is configured to multiply each data symbol in one of the two fifth complex-value data flows, of which the imaginary parts are extracted and to which IDFT spreading is applied, with −j.

17. The reception device of claim 15, wherein the sub-carrier inverse allocation unit is configured to generate the two fourth complex-value data flows by exchanging data symbols at even positions or odd positions in the two first complex-value data flows.

18. The reception device of claim 12, wherein the inverse spreading unit comprises:
   a real/imaginary part extraction unit configured to alternately extract real parts and imaginary parts of the two first complex-value data flows;
   a phase rotation unit configured to rotate phases of the real parts and imaginary parts extracted from the two first complex-value data flows to generate two sixth complex-value data flows;
   an IDFT spreading unit configured to generate two seventh complex-value data flows by applying the IDFT spreading operation to the two sixth complex-value data flows, respectively;
   an inverse pre-coding unit configured to generate two eighth complex-value data flows by applying an inverse pre-coding operation to the two seventh complex-value data flows, respectively; and
   an inverse conjugate symmetric operation unit configured to generate a complex-value data flow by applying the inverse conjugate symmetric operation to the two eighth complex-value data flows.

19. The reception device of claim 18, wherein the phase rotation unit is configured to multiply the real parts extracted from the two first complex-value data flows with 1 and to multiply the imaginary parts extracted from the two first complex-value data flows with an imaginary unit j.

20. The reception device of claim 18, wherein an encoding matrix applied by the inverse pre-coding unit is an inverse matrix or a conjugate transpose matrix of a pre-coding matrix used in a pre-coding operation of a transmitter.

21. The reception device of claim 12, wherein the inverse spreading unit comprises:
   a phase rotation unit configured to rotate a phase of each of the two first complex-value data flows to generate two twelfth complex-value data flows;
   a real/imaginary part extraction unit configured to extract a real part of each data symbol in the two twelfth complex-value data flows;
   an inverse sub-carrier permutation unit configured to permute and combine real parts extracted from the two twelfth complex-value data flows to generate a thirteenth complex-value data flow;
   an IDFT spreading unit configured to generate a fourteenth complex-value data flow by applying the IDFT spreading operation to one of the two twelfth complex-value data flows; and
   an inverse conjugate symmetric operation unit configured to generate a complex-value data flow by applying the inverse conjugate symmetric operation to the fourteenth complex-value data flow.

22. A method for transmitting signals in a wireless communication system, comprising:
   generating two data flows by applying a conjugate symmetric discrete fourier transform (CS-DFT) spreading operation to an input first complex-value data flow, the CS-DFT spreading operation comprising a conjugate symmetric operation and a subsequent discrete fourier transform (DFT) operation;

mapping the two data flows to corresponding sub-carriers, respectively; and generating offset quadrature amplitude modulation (OQAM) signals by applying OQAM operation to the data flows on mapped sub-carriers and transmitting the OQAM signals.

23. A method for receiving signals in a wireless communication system, comprising:

receiving offset quadrature amplitude modulation (OQAM) signals;

demodulating the received OQAM signals to generate two complex-value data flows;

selecting two first complex-value data flows which are from the two complex-value data flows on mapped sub-carriers; and generating a complex-value data flow by applying a conjugate symmetric inverse discrete fourier transform (CS-IDFT) inverse spreading operation to the two first complex-value data flows, the CS-IDFT operation comprising an inverse discrete fourier transform (IDFT) spreading operation and a subsequent inverse conjugate symmetric operation.

* * * * *